| (12) | United States Patent | (10) Patent No.: | US 8,836,808 B2 |
|---|---|---|---|
| | Imai | (45) Date of Patent: | Sep. 16, 2014 |

(54) ADAPTIVE COLOR IMAGING BY USING AN IMAGING ASSEMBLY WITH TUNABLE SPECTRAL SENSITIVITIES

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 13/090,188

(22) Filed: Apr. 19, 2011

(65) Prior Publication Data

US 2012/0268618 A1    Oct. 25, 2012

(51) Int. Cl.
| H04N 5/228 | (2006.01) |
|---|---|
| H04N 5/232 | (2006.01) |
| H04N 9/04 | (2006.01) |
| H04N 101/00 | (2006.01) |

(52) U.S. Cl.
CPC .............. *H04N 5/232* (2013.01); *H04N 9/045* (2013.01); *H04N 2101/00* (2013.01)
USPC ................... 348/222.1; 348/362; 348/207.99

(58) Field of Classification Search
None
See application file for complete search history.

(56) References Cited

U.S. PATENT DOCUMENTS

| 6,466,961 | B1 | 10/2002 | Miller | |
|---|---|---|---|---|
| 6,519,002 | B1 | 2/2003 | Tomaszewski | |
| 7,145,597 | B1 * | 12/2006 | Kinjo | ........................ 348/222.1 |
| 7,417,672 | B2 | 8/2008 | Nakajima et al. | |
| 7,751,640 | B2 | 7/2010 | Li et al. | |
| 2002/0012064 | A1 * | 1/2002 | Yamaguchi | .................... 348/362 |
| 2005/0122405 | A1 * | 6/2005 | Voss et al. | .................. 348/211.2 |
| 2006/0170816 | A1 | 8/2006 | Silverstein et al. | |
| 2006/0214001 | A1 | 9/2006 | Chuang et al. | |
| 2008/0050111 | A1 | 2/2008 | Lee et al. | |
| 2010/0044822 | A1 | 2/2010 | Longoni et al. | |
| 2011/0279682 | A1 * | 11/2011 | Li et al. | ......................... 348/169 |

FOREIGN PATENT DOCUMENTS

| JP | 2002010178 A | * | 1/2002 |
|---|---|---|---|
| JP | 2003244709 A | | 8/2003 |
| KR | 1020060041032 B1 | | 5/2007 |

OTHER PUBLICATIONS

Zaraga et al., "White balance by tunable spectral responsivities", Journal of Optical Society of America, Jan. 2010.*
U.S. Appl. No. 12/871,826, filed Aug. 30, 2010 by Francisco Imai.
U.S. Appl. No. 12/949,592, filed Nov. 18, 2010 by Francisco Imai.
U.S. Appl. No. 13/033,578, filed Feb. 23, 2011 by John Haikin and Francisco Imai.

(Continued)

*Primary Examiner* — Roberto Velez
*Assistant Examiner* — Yih-Sien Kao
(74) *Attorney, Agent, or Firm* — Fitzpatrick, Cella, Harper & Scinto

(57) ABSTRACT

Image capture using an image capture apparatus that includes an imaging assembly. Geographic location of the image capture apparatus is received from a location sensor that obtains geographic location of the image capture apparatus. A capture mask is constructed by calculations which use the geographic location. The constructed capture mask is applied to the imaging assembly, the imaging assembly having a tunable spectral response and being tunable in accordance with the capture mask.

12 Claims, 24 Drawing Sheets

(56) References Cited

OTHER PUBLICATIONS

U.S. Appl. No. 12/949,566, filed Nov. 18, 2010 by Francisco Imai.
U.S. Appl. No. 12/859,115, filed Aug. 18, 2010 by Francisco Imai.
A. Longoni, et al., "The Transverse Field Detector (TFD): A Novel Color-Sensitive CMOS Device", IEEE Electron Device Letters, 29, pp. 1306-1308, (2008).
Langfelder et al., "Design and Realization of a Novel Pixel Sensor for Color Imaging Applications in CMOS 90 NM Technology", Electronics and Information Department, Politecnico di Milano, Italy, 143-146 (2010).
Vrhel et al., "Measurement and Analysis of Object Reflectance Spectra", Color Research and Application, vol. 19, No. 1, pp. 4-9, Feb. 1994.

* cited by examiner

GEOGRAPHIC LOCATION LUT 601

Geographic Location 602

Color Schemes 603

| Position Coordinates (latitude/longitude) | Color Scheme LUT Name |
|---|---|
| 0-15 degrees N/0-20 degrees W | Accra Color Scheme |
| 0-15 degrees N/20-40 degrees W | Color Scheme 2 |
| 0-15 degrees N/40-60 degrees W | Color Scheme 3 |
| ⋮ | ⋮ |
| 60-75 degrees N/20-40 degrees E | Helsinki Color Scheme |
| 60-75 degrees N/40-60 degrees E | Color Scheme 84 |
| ⋮ | ⋮ |
| 75-90 degrees S/160-180 degrees E | Color Scheme 216 |

FIG. 6

Helsinki Color Scheme 701

| Hue Name | Hue Angle | Brightness | Saturation |
|---|---|---|---|
| Red | 0° | +10 | -10% |
| Yellow | 60° | +15 | -20% |
| Green | 120° | +10 | -15% |
| Cyan | 180° | 0 | -5% |
| Blue | 240° | -5 | +5% |
| Magenta | 300° | +5 | 0% |

Accra Color Scheme 702

| Hue Name | Hue Angle | Brightness | Saturation |
|---|---|---|---|
| Red | 0° | -5 | +10% |
| Yellow | 60° | -10 | +5% |
| Green | 120° | -5 | +15% |
| Cyan | 180° | 0 | 0% |
| Blue | 240° | +5 | +5% |
| Magenta | 300° | +5 | +5% |

GEOGRAPHIC LOCATION LUT 1101

Geographic Location 1102     Season 1103     Color Schemes 1104

| Position Coordinates (latitude/longitude) | Season | Color Scheme LUT Name |
|---|---|---|
| 0-15 degrees N/0-20 degrees W | June-August | Summer in Accra Color Scheme |
| 0-15 degrees N/20-40 degrees W | September-November | Color Scheme 2 |
| 0-15 degrees N/40-60 degrees W | June-August | Color Scheme 3 |
| ... | ... | ... |
| 60-75 degrees N/20-40 degrees E | June-August | Summer in Helsinki Color Scheme |
| 60-75 degrees N/40-60 degrees E | June-August | Color Scheme 84 |
| ... | ... | ... |
| 75-90 degrees S/160-180 degrees E | September-November | Color Scheme 216 |

FIG. 11

GEOGRAPHIC LOCATION LUT 1201

| Position Coordinates (latitude/longitude) | Time of Day | Color Scheme LUT Name |
|---|---|---|
| 0-15 degrees N/0-20 degrees W | 10:00pm to 12:00am | Night in Accra Color Scheme |
| 0-15 degrees N/20-40 degrees W | 10:00pm to 12:00am | Color Scheme 2 |
| 0-15 degrees N/40-60 degrees W | 10:00pm to 12:00am | Color Scheme 3 |
| ⋮ | ⋮ | ⋮ |
| 60-75 degrees N/20-40 degrees E | 10:00pm to 12:00am | Night in Helsinki Color Scheme |
| 60-75 degrees N/40-60 degrees E | 10:00pm to 12:00am | Color Scheme 84 |
| ⋮ | ⋮ | ⋮ |
| 75-90 degrees S/160-180 degrees E | 7:00am to 5:00pm | Color Scheme 216 |

- Geographic Location 1202
- Time of Day 1203
- Color Schemes 1204

FIG. 12

GEOGRAPHIC LOCATION LUT 1301

| Geographic Location 1302 | Specific Date 1303 | Color Schemes 1304 |
|---|---|---|
| Position Coordinates (latitude/longitude) | Specific Date | Color Scheme LUT Name |
| 0-15 degrees N/0-20 degrees W | March 17 | St. Patrick's Day in Accra Color Scheme |
| 0-15 degrees N/20-40 degrees W | December 25 | Color Scheme 2 |
| 0-15 degrees N/40-60 degrees W | December 31 | Color Scheme 3 |
| . . . | . . . | . . . |
| 60-75 degrees N/20-40 degrees E | March 17 | St. Patrick's Day in Helsinki Color Scheme |
| 60-75 degrees N/40-60 degrees E | March 17 | Color Scheme 84 |
| . . . | . . . | . . . |
| 75-90 degrees S/160-180 degrees E | December 25 | Color Scheme 216 |

FIG. 13

| R G Y G B G B | R G Y G B G B | R G Y G B G B |
|---|---|---|
| R G Y G B G B | R G Y G B G B | R G Y G B G B |
| R G Y G B G B | R G Y G B G B | R G Y G B G B |

FIG. 14

| RGB | YCM | RGB |
|-----|-----|-----|
| YCM | RGB | YCM |
| RGB | YCM | RGB |

FIG. 22

| 1<br>YCM | 2<br>RGB | 3<br>YCM |
|---|---|---|
| 4<br>RGB | 5<br>YCM | 6<br>RGB |
| 7<br>YCM | 8<br>RGB | 9<br>YCM |

FIG. 23A

| 1<br>RGB<br>(interpolated) | 2<br>RGB | 3<br>RGB<br>(interpolated) |
|---|---|---|
| 4<br>RGB | 5<br>RGB<br>(interpolated) | 6<br>RGB |
| 7<br>RGB<br>(interpolated) | 8<br>RGB | 9<br>RGB<br>(interpolated) |

FIG. 23B

| 1<br>YCM | 2<br>YCM<br>(interpolated) | 3<br>YCM |
|---|---|---|
| 4<br>YCM<br>(interpolated) | 5<br>YCM | 6<br>YCM<br>(interpolated) |
| 7<br>YCM | 8<br>YCM<br>(interpolated) | 9<br>YCM |

FIG. 23C

ADAPTIVE COLOR IMAGING BY USING AN IMAGING ASSEMBLY WITH TUNABLE SPECTRAL SENSITIVITIES

FIELD

The present disclosure relates to image capture in which capture parameters for an imaging assembly with tunable spectral sensitivities are adjusted automatically.

BACKGROUND

Typical imaging systems have fixed spectral sensitivities. To achieve a certain look with image data captured thereby, color content, brightness, contrast and other image attributes of the captured image are manipulated post-capture. For example, in fashion photography post-capture processing is performed on captured images to enhance specific colors that are currently in style.

Although the appearance of a captured image can be adjusted during image capture by using filters positioned in front of a lens, or by controlling and/or filtering lighting in a studio setting, the range of colors that can be captured by a typical imaging system is ordinarily limited by its fixed spectral sensitivities.

SUMMARY

Recently, imaging assemblies have been developed in which the imaging assemblies have a tunable spectral response. Two examples of such imaging assemblies are described here. In the first example of imaging assemblies which have a tunable spectral response, there are imaging assemblies where the image sensor itself has a tunable spectral response. For instance, there is an image sensor described in "The Transverse Field Detector: A Novel Color Sensitive CMOS Device", Zaraga, IEEE Electron Device Letters 29, 1306-1308 (2008), "Design and Realization of a Novel Pixel Sensor for Color Imaging Applications in CMOS 90 NM Technology", Langfelder, Electronics and Information Department, Politecnico di Milano, via Ponzio 34/5 20133, Milano, Italy, 143-146 (2010), and U.S. Patent Publication No. 2010/0044822, the contents of which are incorporated herein by reference. These documents describe a transverse field detector (TFD) which has a tunable spectral responsivity that can be adjusted by application of bias voltages to control electrodes. Each pixel outputs signals for a red-like channel, a green-like channel, and a blue-like channel.

In the second example of imaging assemblies which have a tunable spectral response, there are imaging assemblies where the image sensor is preceded by a color filter array (CFA), and it is the color filter array that has a tunable spectral response. In the first example described above, because the image sensor itself has a tunable spectral response, it might be customary to omit a preceding color filter array, since the inclusion of any filter necessarily would decrease the signal-to-noise ratio by filtering the amount of light incident on the image sensor. In contrast, in this second example, the spectral responsivity of the image sensor is not necessarily tunable, but the spectral responsivity of a preceding color filter array is. For instance, there is a tunable color filter array described in U.S. Pat. No. 6,466,961 by Miller, "Methods for Adaptive Spectral, Spatial and Temporal Sensing for Imaging Applications", the content of which is incorporated herein by reference. This document describes an imaging assembly comprising a color filter array which precedes an image sensor whose spectral responsivity is constant, but in which the color filter array itself has a tunable spectral responsivity that can be adjusted by application of bias voltages to control electrodes. Each array element thus filters light incident on corresponding pixels of the image sensor, and the image sensor thereafter outputs signals from which a red-like channel, a green-like channel, and a blue-like channel, can all be derived for each pixel. In the case of a color filter array with temporal sensing, the channels for each pixel may be output sequentially, one after the other. In the case of a color filter array with spatial sensing, the channels for each pixel may be output simultaneously or nearly so, although demosaicing might be required depending on the geometry of the color filter array.

A spatial mosaic can be constructed using tunable color filters on top of individual imaging sensors. A Bayer-type mosaic provides color filters tuned to provide three channels distributed spatially. The number of channels can be increased beyond three by tuning color filters to provide four, five or more channels distributed spatially. There is a trade-off between spectral resolution, which is determined by the number of channels, and spatial resolution. However, by increasing the number of pixels of an image sensor, the visual effect of loss in spatial resolution can be minimized. An increased complexity of the spatial mosaic typically requires more complex demosaicing procedures as well as larger spatial filters for demosaicing.

In some of the above example imaging assemblies, the spectral responsivity is tunable globally, meaning that all pixels in the image sensor are tuned globally to the same spectral responsivity.

In some others of these imaging assemblies, the spectral responsivity is tunable on a pixel by pixel basis or a region-by-region basis. Bias voltages are applied in a grid-like spatial mask, such that the spectral responsivity of each pixel is tunable individually of other pixels in the image sensor, or such that the spectral responsivity of each region comprising multiple pixels is tunable individually of other regions in the image sensor.

U.S. application Ser. No. 12/871,826, by Francisco Imai, entitled "Image Capture With Region-Based Adjustment Of Imaging Properties", the contents of which are incorporated by reference herein, describes tuning spectral responsivity based on a user selection of targeted imaging properties for selected regions of interest in a scene.

The disclosure herein provides automatic adjustment of capture parameters for an imaging assembly with tunable spectral sensitivities, based at least in part on geographic location in combination with other information pertinent to time of capture.

According to an aspect of the disclosure herein, an image capture apparatus includes an imaging assembly that has a tunable spectral response and that is tunable in accordance with a capture mask. Geographic location of the image capture apparatus is received from a location sensor that obtains geographic location of the image capture apparatus. A capture mask is constructed by calculations which use the geographic location, and the constructed capture mask is applied to the imaging assembly.

By virtue of automatically adjusting the spectral response of the imaging assembly based on geographic location, the imaging assembly may provide captured images that are automatically adapted to the geographic location at which the image is captured.

In another example embodiment described herein, the imaging assembly comprises an image sensor which has a tunable spectral response. A database stores information which correlates geographic location to capture parameters, and in constructing the capture mask, the database is accessed to determine the nature of adjustments to the capture mask. The database stores information correlating cultural factors that can be inferred from the geographic location of the image capture apparatus.

In another example embodiment described herein, the database also stores information correlating seasonal factors to time and date information, wherein time and date information is received and the database is accessed to determine the nature of adjustments to the capture mask based also on seasonal factors.

In another example embodiment described herein, color is adjusted based on seasonal factors.

In another example embodiment described herein, seasonal factors include color trends for a current season, and the capture mask is adjusted in accordance with a color scheme based on the color trends for the season.

In another example embodiment described herein, time and date information is received, and the capture mask is constructed by calculations which use the time and date information.

In another example embodiment described herein, the capture mask is constructed to obtain a relatively higher spatial resolution and a relatively lower number of spectral components. A preview image data having a high number of spectral components is obtained, and spectral signatures of objects in the preview are obtained. Materials of the objects are identified based on the spectral signatures, and the capture mask is constructed by calculations which use both of the geographic location and the identities of the materials of the objects in the preview.

In another example embodiment described herein, the capture mask is constructed to obtain a relatively lower spatial resolution and more than three (3) spectral components. A preview image data having a high number of spectral components is obtained, and spectral signatures of objects in the preview are obtained. Materials of the objects are identified based on the spectral signatures, and the capture mask is constructed by calculations which use both of the geographic location and the identities of the materials of the objects in the preview.

In another example embodiment described herein, the capture mask is constructed to obtain more than three (3) spectral components. A preview image data having a high number of spectral components is obtained, and spectral signatures of objects in the preview are obtained. Materials of the objects are identified based on the spectral signatures, and the capture mask is constructed by calculations which use both of the geographic location and the identities of the materials of the objects in the preview.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 6 is a diagram showing an example geographic location look-up-table according to an example embodiment.

FIGS. 8A and 8B are diagrams showing color scheme LUTs according to an example embodiment.

FIG. 11 is a diagram showing an example geographic location look-up-table that correlates geographic location and seasons to color schemes according to an example embodiment.

FIG. 12 is a diagram showing an example geographic location look-up-table that correlates geographic location and time of day to color schemes according to an example embodiment.

FIG. 13 is a diagram showing an example geographic location look-up-table that correlates geographic location and specific dates to color schemes according to an example embodiment.

FIG. 14 is a conceptual illustration of color channels of each pixel in the imaging sensor with tunable color sensitivities in an example embodiment.

FIG. 22 is a conceptual illustration of color channels of each pixel in the imaging sensor with tunable color sensitivities in an example embodiment.

FIG. 23A illustrates an example 3×3 pixel group of a captured sample image, FIG. 23B illustrates a demosaiced first image, and FIG. 23C illustrates a demosaiced second image.

DETAILED DESCRIPTION

In the following example embodiments, there is described a digital camera which may be a digital still camera or a digital video camera. It is understood, however, that the following, description encompasses arbitrary arrangements which can incorporate or utilize such imaging assemblies having a spectral response which is tunable in accordance with a capture parameter, for instance, a data processing apparatus having an image sensing function (e.g., a personal computer) or a portable terminal having an image sensing function (e.g., a mobile telephone).

<FIGS. 1 to 17>

FIGS. 1 to 16 relate to an embodiment in which the imaging assembly includes an image sensor that has a tunable spectral response. The image sensor involves a transverse field detector (TFD) which has a tunable spectral responsivity that can be adjusted by application of bias voltages to control electrodes. Each pixel outputs signals for a red-like channel, a green-like channel, and a blue-like channel.

Figure 1:
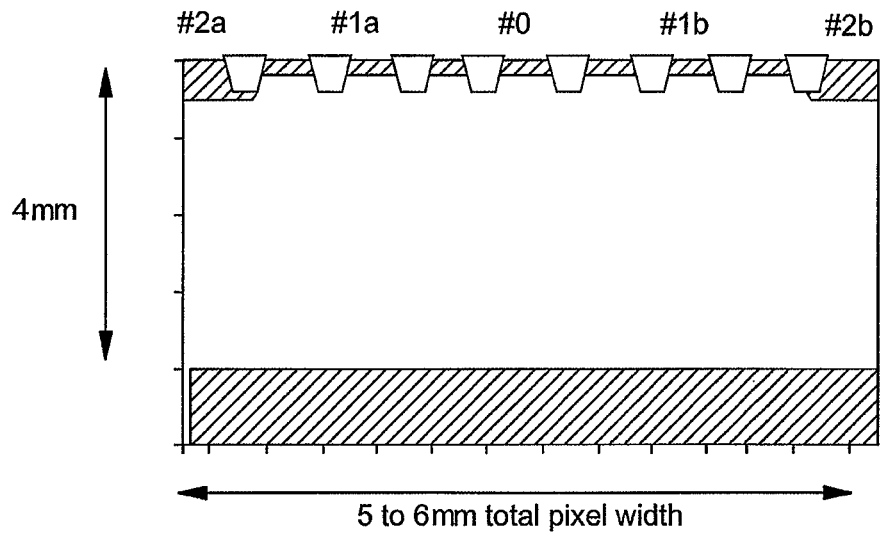
FIG. 1 is a schematic view of a cross section of a TFD pixel.

In such a three channel TFD, symmetric biasing is applied, such that related pairs of control electrodes each receive the same bias voltages. FIG. 1 is a schematic view of a cross section of a TFD three channel pixel. As shown in FIG. 1, symmetric biasing is applied, such that control electrodes #2A and #2B each receive the same bias voltage, and control electrodes #1A and #1B each receive the same bias voltage.

A TFD with more than three channels can be provided by applying an asymmetric biasing to a symmetric TFD pixel and increasing the number of acquisition spectral in the same pixel area. This arrangement is described in detail in U.S. application Ser. No. 12/949,592, by Francisco Imai, entitled "Adaptive Spectral Imaging By Using An Imaging Assembly With Tunable Spectral Sensitivities", the contents of which are incorporated by reference herein.

For example, asymmetric biasing could be applied to the TFD pixel shown in FIG. 1, such that control electrodes #2A and #2B each receive a different bias voltage, and control electrodes #1A and #1B each receive a different bias voltage. Thus, by applying asymmetric biasing, each of the five electrodes of the TFD pixel could receive a different bias voltage, thereby providing for five channels that can each be tuned to different spectral sensitivities.

Figure 2A:
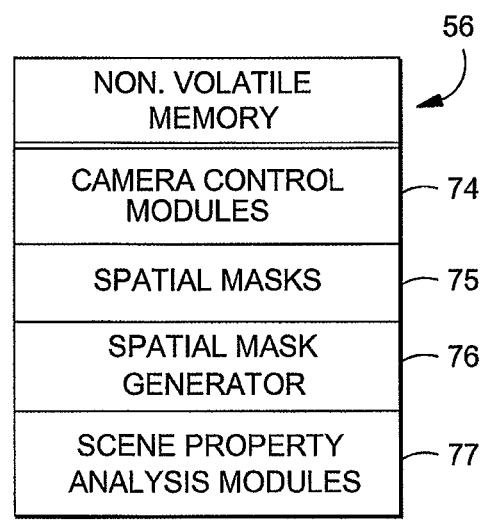
FIG. 2A is a view for explaining the architecture of modules according to an example embodiment.
Figure 2:
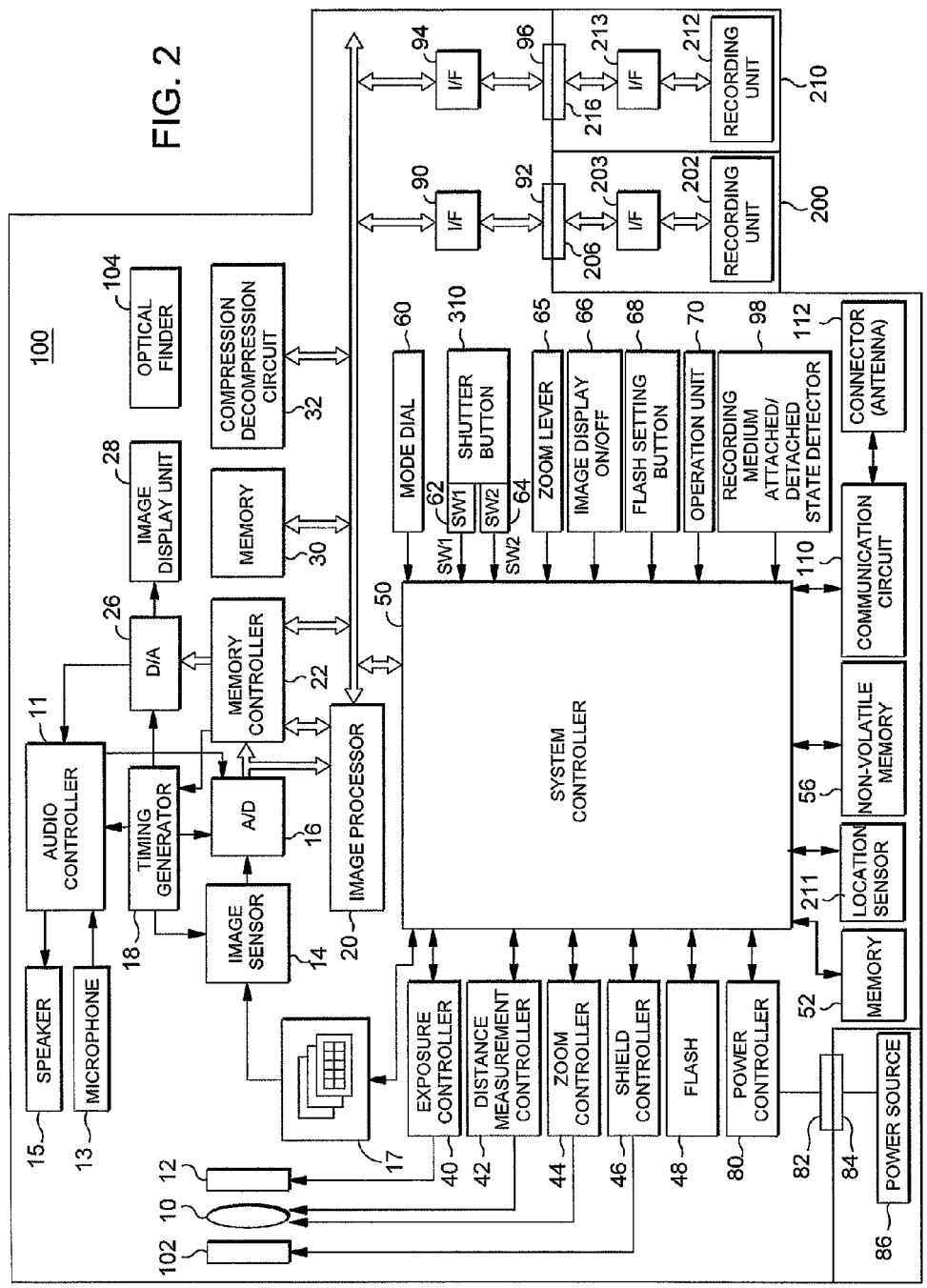
FIG. 2 is a block diagram showing an example embodiment of a multi-spectral digital camera.

FIG. 2 is a block diagram showing an example of the arrangement of a digital camera 100 as an image capturing device according to an embodiment in which the image sensor has a spectral response which is tunable in accordance with a capture mask that is constructed to obtain more than three (3) spectral components.

In particular, the capture mask is represented by a capture parameter that is comprised of multiple spatial masks, with one mask each for each channel of information output by the image sensor. In this example, the image sensor outputs five or more channels, and the capture parameter includes a spatial mask DR for a red-like channel of information, a spatial mask DGY for a green-yellow-like channel of information, a spatial mask DG for a green-like channel of information, a spatial mask DBG for a blue-green-like channel of information and a spatial mask DB for a blue-like channel of information. Each spatial mask comprises an array of control parameters corresponding to pixels or regions of pixels in the image sensor. The spectral responsivity of each pixel, or each region of plural pixels, is thus tunable individually and independently of other pixels or regions of pixels. In this example, the image sensor is comprised of a transverse field detector (TFD) sensor mentioned hereinabove with respect to FIG. 1, and the spatial masks DR, DGY, DG, DBG and DB correspond to voltage biases applied to control electrodes of the TFD sensor.

Referring to FIG. 2, reference 211 denotes a location sensor that obtains geographic location of the digital camera. In the example embodiment, the location sensor 211 includes geo-location capabilities. In the example embodiment, the location sensor 211 includes a GPS (Global Positioning System) receiver that receives geographic location from GPS satellites via a wireless communication interface. However, in other embodiments, the location sensor can include any suitable type of geo-location capabilities that obtain geographic location of the digital camera. In other embodiments, the location sensor receives geographic location from another device that includes geo-location capabilities, via either a wireless communication interface or a wired communication interface.

Reference numeral 10 denotes an imaging lens; 12, a shutter having an aperture function; and 14, an image sensor which has a spectral response which is tunable in accordance with a capture parameter, which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 2, an imaging assembly is comprised of image sensor 14 and associated optics, such that in some embodiments the imaging assembly is comprised of image sensor 14 and lens 10.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 has a spectral response which is tunable in accordance with a capture parameter 17. For each pixel, image sensor 14 outputs five or more channels of color information, including a red-like channel, a green-yellow-like channel, a green-like channel, a blue-green-like channel, and a blue-like channel. The precise nature of the spectral responsivity of image sensor 14 is controlled via capture parameter 17. In this embodiment, capture parameter 17 may be comprised of multiple spatial masks, with one mask each for each channel of information output by image sensor 14. Thus, in this example, where image sensor 14 outputs five or more channels, capture parameter 17 includes a spatial mask DR for the red-like channel of information, a spatial mask DGY for the green-yellow-like channel of information, a spatial mask DG for the green-like channel of information, a spatial mask DBG for the blue-green-like channel of information and a spatial mask DB for the blue-like channel of information. Each spatial mask comprises an array of control parameters corresponding to pixels or regions of pixels in image sensor 14. The spectral responsivity of each pixel, or each region of plural pixels, is thus tunable individually and independently of other pixels or regions of pixels.

Image sensor 14 may be comprised of a transverse field detector (TFD) sensor mentioned hereinabove. Spatial masks DR, DGY, DG, DBG and DB may correspond to voltage biases applied to control electrodes of the TFD sensor.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

In particular, and as shown in FIG. 2A, non-volatile memory 56 is an example of a non-transitory computer-readable memory medium, having stored thereon camera control modules 74 as described herein. Also stored thereon are pre-designated capture parameters for application to image sensor 14 so as to control spectral responsivity of the image sensor. In this embodiment, the capture parameters are comprised of spatial masks 75 so as to permit pixel-by-pixel or region-by-region control of spectral responsivity, independently of other pixels or regions. A spatial mask generator 76 generates masks, such as by providing one of pre-designated masks 75 or by deriving a new mask. The derived mask may be based on a comparison of scene properties as provided by scene property analysis module 77.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensing device 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensing device 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3:
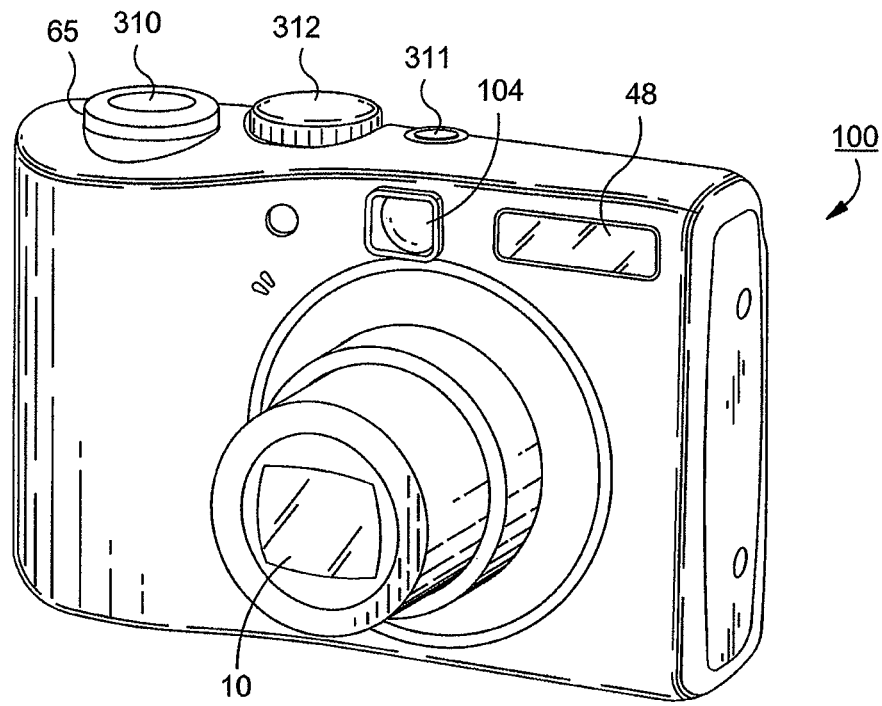
FIGS. 3 and 4 are views showing external appearance of an example embodiment.
Figure 4:
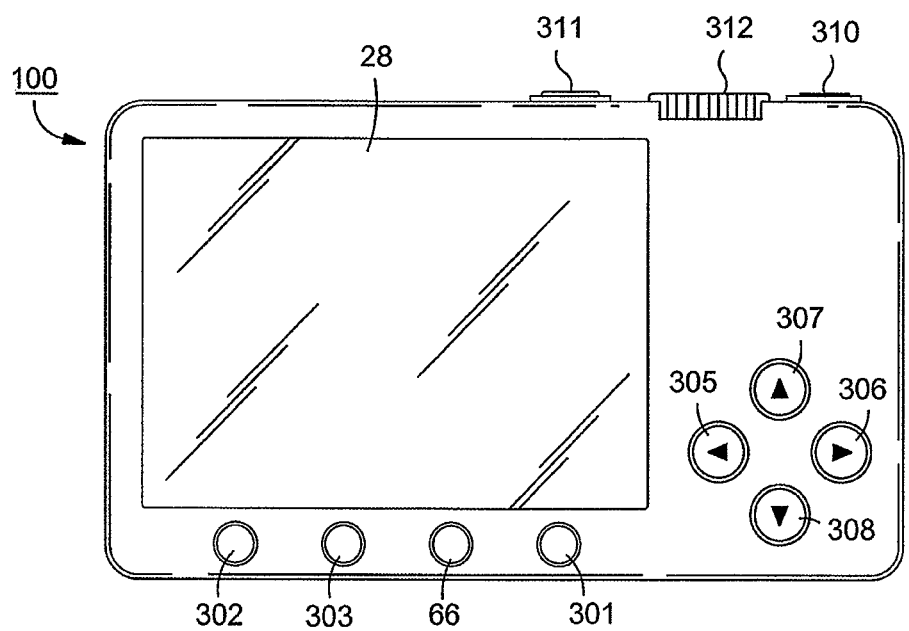

FIGS. 3 and 4 are views showing an example of an external appearance of the digital camera 100. Note in these figures, some components are omitted for description purpose. The aforementioned operation unit 70 comprises, e.g., buttons and switches 301 to 311. A user operates these buttons and switches 301 to 311 for turning ON/OFF the power of the digital camera 100, for setting, changing or confirming the shooting parameters, for confirming the status of the camera, and for confirming shot images.

The power button 311 is provided to start or stop the digital camera 100, or to turn ON/OFF the main power of the digital camera 100. The menu button 302 is provided to display the setting menu such as shooting parameters and operation modes of the digital camera 100, and to display the status of the digital camera 100. The menu has, e.g., a hierarchical structure, and each hierarchy includes selectable items or items whose values are variable.

A delete button 301 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 303 is pressed for selecting a mode or an item. When the enter button 303 is pressed, the system controller 50 sets the mode or item selected at this time. The display ON/OFF button 66 is used for selecting displaying or non-displaying of photograph information regarding the shot image, and for switching the image display unit 28 to be functioned as an electronic view finder.

A left button 305, a right button 306, an up button 307, and a down button 308 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification) as mentioned above.

A recording/playback selection switch 312 is used for switching a recording mode to a playback mode, or switching a playback mode to a recording mode. Note, in place of the above-described operation system, a dial switch may be adopted or other operation systems may be adopted.

Figure 5:
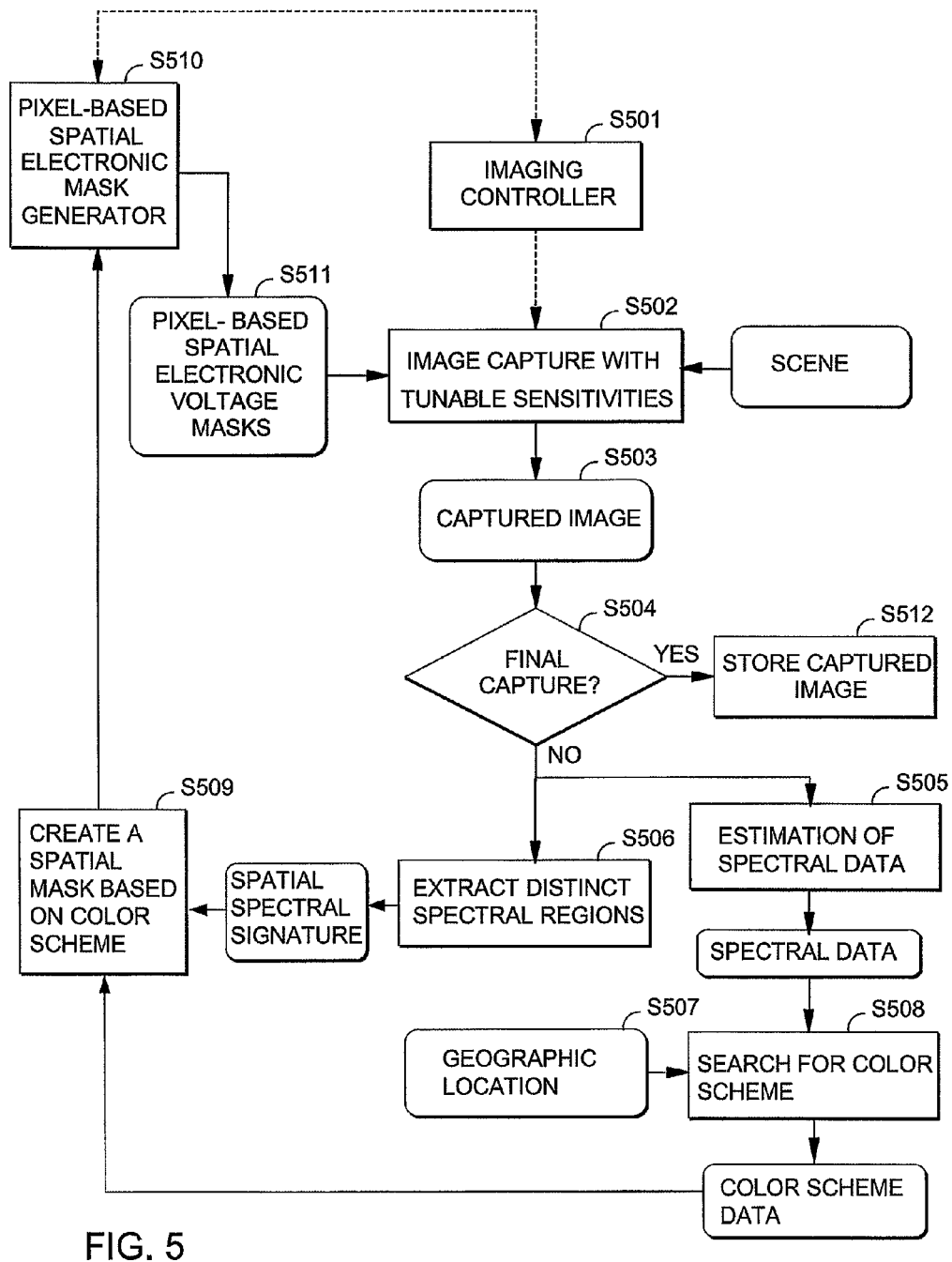
FIG. 5 is a flow diagram for explaining an example embodiment of a spectral image capture of a scene.

FIG. 5 is a flow diagram for explaining an example embodiment of an image capture of a scene in which spectral selectivity of an imaging sensor with tunable spectral properties is adjusted by using a capture mask that is constructed by calculations which use geographic location.

In general, geographic location of an image capture apparatus is received from a location sensor that obtains geographic location of the image capture apparatus, and a capture mask is constructed by calculations which use the geographic location. The constructed capture mask is applied to an imaging assembly of the image capture apparatus, the imaging assembly having a tunable spectral response and being tunable in accordance with the capture mask. An image of a scene is captured and stored by using the image sensor which is tuned in accordance with the capture mask.

In example embodiments, the capture mask is constructed by calculations which use spectral signatures obtained from preview image data of the scene, in addition to the geographic location of the image capture apparatus. The preview image data is obtained by using a default capture mask to capture an image of the scene. The default capture mask is constructed to provide preview image data that has a high number of spectral components. More specifically, the geographic location is used to retrieve a color scheme for the scene that is stored in a database. The database stores information which correlates geographic location to color schemes used to determine capture parameters, and a database search is performed to retrieve the color scheme that corresponds to the received geographic location. The color schemes correlate spectral signatures to corresponding image capture adjustment values. The correlation between spectral signatures and image capture adjustment values can be determined based one or more of geographic location, cultural factors, object material identities, time and date information, and seasonal factors, and the like. The image capture adjustment values are used to construct the new capture mask.

In a particular embodiment shown in FIG. 5, geographic location of the digital camera 100 is received from the location sensor 211. A default capture mask (represented by capture parameter 17 of FIG. 2) is constructed to obtain more than three (3) spectral components. Preview image data having high number of spectral components is obtained by using the default capture mask to capture an image of a scene, and spectral signatures of the preview image data are obtained. A new capture mask is constructed (i.e., capture parameter 17 of FIG. 2 is adjusted) by calculations which use both of the geographic location and the spectral signatures of the preview image data. The new capture mask is applied to the imaging sensor 14, thereby tuning the image sensor in accordance with the capture mask. An image of the scene is captured and stored by using the image sensor which is tuned in accordance with the new capture mask. In this manner, the image sensor 14 may provide captured images that are automatically adapted to the geographic location at which the image is captured.

A general description of the steps in FIG. 5 will now be provided. In steps S501 to S506 spectral signatures are obtained from preview image data of the scene. In step S507, geographic location of the digital camera 100 is received from the location sensor 211, and in steps S508 to S510, the capture mask is constructed by calculations which use both the obtained spectral signatures and the received geographic location. In steps S511 and S502, the capture mask is applied to the image sensor 14.

A description of how the capture mask is constructed by calculations which use both the spectral signatures obtained in steps S501 to S506 and the geographic location received in step S507 will now be provided.

In the example embodiment, a database stores information which correlates geographic location to color schemes used to determine capture parameters, and a database search is performed to retrieve the color scheme that corresponds to the geographic location received in step S507. In the example embodiment, the database is located in a server that is external to the digital camera 100. In another example embodiment, the database is located in a network cloud that includes various computing devices, servers, storage devices, and the like. In yet another example embodiment, the database is located in the digital camera 100, such that the database is automatically updated.

FIG. 6 shows an example geographic location look-up-table (LUT) 601 that is stored in the database, and that correlates geographic location 602 to color schemes 603. As shown in FIG. 6, geographic location is represented by a range of GPS position coordinates in a format corresponding to a format of GPS position coordinates received by the location sensor 211. The GPS position coordinates include a latitude coordinate and a longitude coordinate. Each color scheme is represented as a color scheme look-up-table (LUT), or a reference to a color scheme LUT. In one example embodiment, the color scheme LUT correlates hue with image capture adjustment values for brightness and saturation, the image capture adjustment values for brightness and saturation indicating local preferences for each corresponding hue. In another example embodiment, the color scheme LUT correlates materials with corresponding image capture adjustment values for brightness and saturation, the image capture adjustment values for brightness and saturation indicating local preferences for each corresponding material. As shown in FIG. 6, the geographic location LUT correlates the range of position coordinates "60-75 degrees N/20-40 degrees E" with a color scheme for Helsinki, and correlates the range of position coordinates "0-15 degrees N/0-20 degrees W" with a color scheme for Accra.

Figure 7:
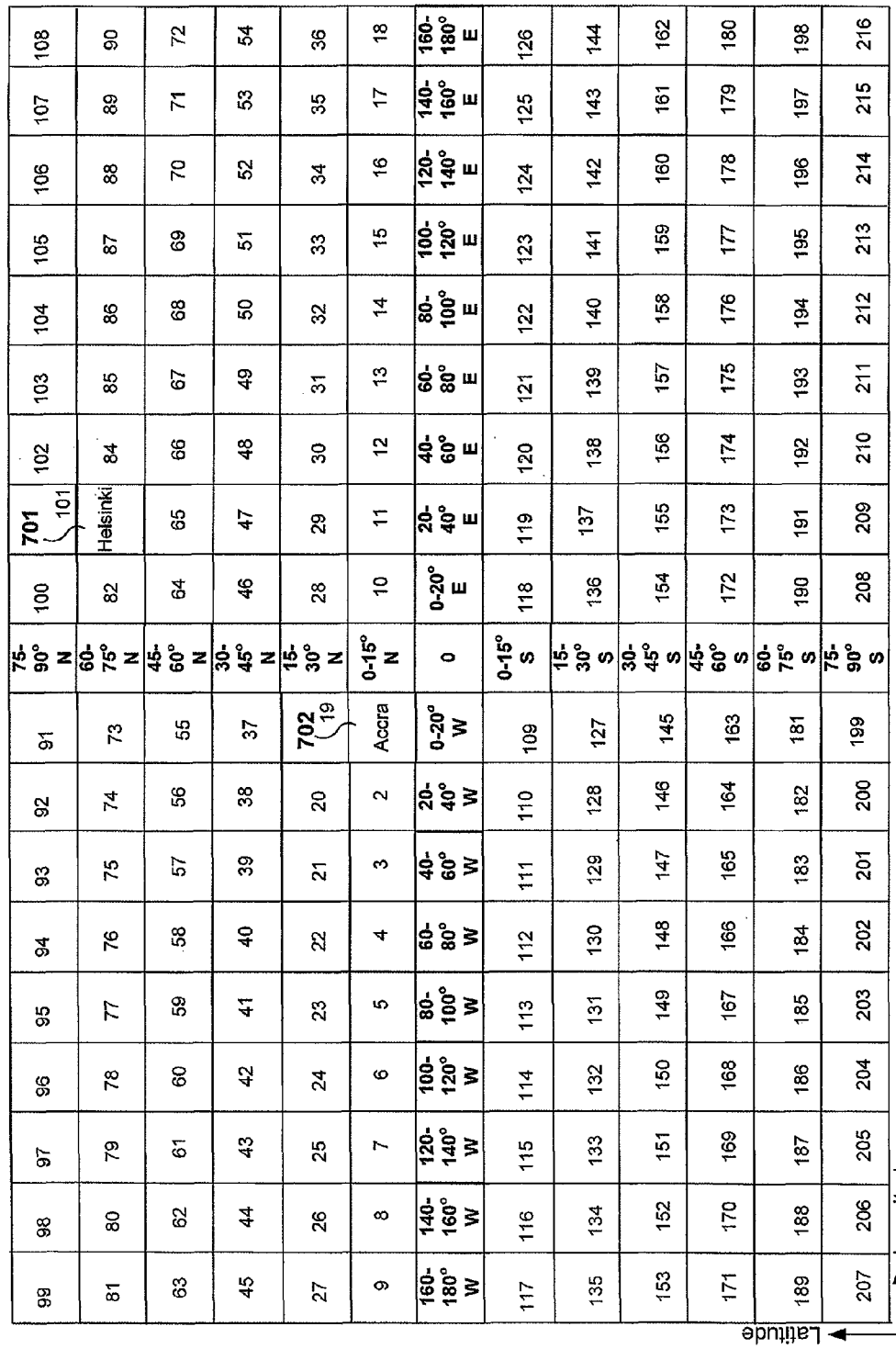
FIG. 7 is a diagram showing a visual representation of the geographic location LUT of FIG. 6.

FIG. 7 is a visual representation of the geographic location LUT of FIG. 6. FIG. 7 depicts a coordinate system that represents the set of GPS coordinates that represent all locations on Earth. As shown in FIG. 7, the longitude axis is divided into 20° intervals, from 180° W to 180° E, and the latitude axis is divided into 15° intervals, from 90° S to 90° N. As shown in FIG. 7, table 701 represents the color scheme LUT for Helsinki located at the point on the coordinate system represented by the range 60-75° N latitude/20-40° E longitude. Table 702 represents the color scheme LUT for Accra located at the point on the coordinate system represented by the range 0-15° N latitude/0-20° W longitude. A database search is performed using the geographic location LUT to retrieve the color scheme that corresponds to the position coordinates received by the location sensor 211 in step S507. For example, if the GPS position coordinates received by the location sensor 211 in step S507 are "65 degrees N/30 degrees E", then the database search will retrieve the color scheme for Helsinki, since the received GPS position coordinates are within the range "60-75 degrees N/20-40 degrees E" which corresponds to the color scheme for Helsinki.

Figure 9:
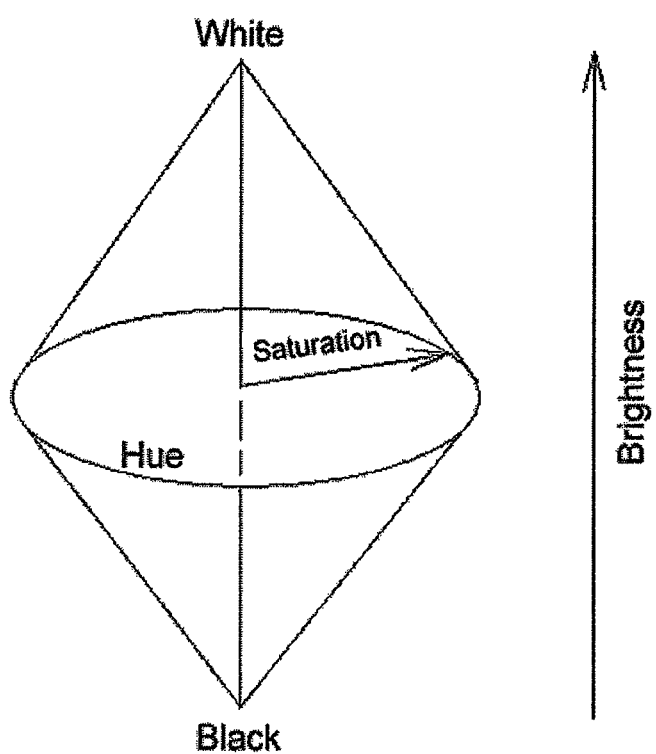
FIG. 9 is a diagram of a color spindle that describes the relationship between hue, saturation and brightness.

Examples of the color schemes will now be described in more detail. FIGS. 8A and 8B show color scheme LUTs for Helsinki (701 of FIG. 7) and Accra (702 of FIG. 7), respectively. As shown in FIGS. 8A and 8B, color is represented by hue, saturation and brightness, and FIG. 9 shows a color spindle that describes the relationship between hue, saturation and brightness. As shown in FIG. 9, saturation decreases toward the brightness axis. Hue is represented numerically by continuous angle values (for example Red is 0 degrees, yellow is 60 degrees, green is 120 degrees, cyan is 180 degrees, blue is 240 degrees, magenta is 300 degrees returning to red at 360 degrees). The color scheme LUTs of FIGS. 8A and 8B each correlate hue with image capture adjustment values for brightness and saturation, the image capture adjustment values for brightness and saturation indicating local preferences for each corresponding hue. In the example embodiment, the brightness units for each LUT are units of luminance and saturation is specified by a percentage (0% is absence of color and 100% corresponds to pure hue). In other embodiments, color can be represented by any other suitable type of color representation.

A comparison of the color schemes shown in FIGS. 8A and 8B will now be provided. FIG. 8A shows a color scheme LUT for example color preferences in Helsinki, Finland (in Europe) which is generally located in Northern Europe where there are long, bright days during summer and dark nights during winter. In Helsinki, color preferences for de-saturated but bright colors might be predominant, since these colors might tend to compensate for the winter darkness. Accordingly, color scheme LUT 701 of FIG. 8A includes representative hue names 802 and hue angles 803, and corresponding image capture adjustment values for brightness 804 and saturation 805 that indicate how brightness and saturation should be adjusted in relation to a baseline, according to local preferences in Helsinki. Thus, as shown in FIG. 8A, color scheme LUT 701 includes image capture adjustment values for brightness 804 and saturation 805 in accordance with a preference for de-saturated but bright colors.

In comparison to FIG. 8A, FIG. 8B shows a color scheme LUT for example color preferences in Accra, Ghana (in Africa) which is generally located near the Equator line. In Accra, color preferences for very saturated, but darker colors might be predominant. Accordingly, color scheme LUT 702 of FIG. 8A includes representative hue names 807 and hue angles 808, and corresponding image capture adjustment values for brightness 809 and saturation 810 that indicate how brightness and saturation should be adjusted in relation to a baseline, according to local preferences in Accra. Thus, as shown in FIG. 8B, color scheme LUT 702 includes image capture adjustment values for brightness 809 and saturation 810 in accordance with a preference for very saturated, but darker colors.

The geographic location look-up-table (LUT) 601 also correlates geographic location to other color scheme LUTs, with adjustment values tailored to geographic location.

In the example embodiment, in addition to performing a database search to retrieve a color scheme, a database searched is performed to retrieve hue names corresponding to the spectral signatures obtained in steps S501 to S506 of FIG. 5, by using a spectral signature LUT that correlates spectral signatures with hue names.

The spectral signatures LUT is generated by measuring objects having known hues using a spectrophotometer to determine spectral reflectance factors for the object. The measured spectral reflectance factors of each object are used to determine a representation of the spectral signature that corresponds to the hue name of the object. The hue names and associated spectral signature representations are stored in the spectral signature LUT in correspondence with each other. The spectrophotometer includes a known illumination source, a standardized measurement geometry, and a calibrated sensor. In the example embodiment, the spectrophotometer's illumination source provides a white light that has energy in all wavelengths in the measuring range. The light shines onto the surface of the measured object and its reflection is captured by the calibrated sensor. In the example embodiment, the measurement geometry is arranged such that the light provided by the illumination source is incident at a 45 degree angle to the normal to the surface of the measured object, and the calibrated sensor measures at a 0 degree angle to the normal to the surface of the measured object. In the example embodiment, the measured objects are color patches of a GretagMacbeth ColorChecker rendition chart.

The following is a description of one implementation by which the measured spectral reflectance factors of each object are used to determine representations of the spectral signatures that correspond to the hue names of the objects. For each hue name, single value decomposition is performed to determine a set of eigenvectors and corresponding coefficients that represent the measured spectral reflectance factors. In the example embodiment, the single value decomposition involves determining a first eigenvector that accounts for most of the variance, a second eigenvector that is orthogonal to the first eigenvector, a third eigenvector that is orthogonal to the second eigenvector, a fourth eigenvector that is orthogonal to the third eigenvector, a fifth eigenvector that is orthogonal to the fourth eigenvector, and a sixth eigenvector that is orthogonal to the fifth eigenvector, and determining six eigenvector coefficients, one for each of the six eigenvectors.

Table 1 shows the six eigenvectors, according to the example embodiment. The six example eigenvectors shown in Table 1 were calculated for a training set comprising 354 spectral reflectances by combining spectral measurements from a set of 120 spectral DuPont paint chips, 64 Munsell chips and 170 reflectance spectra from various natural and man-made objects as described in M. J. Vrhel, R. Gershon, and L. Iwan, "The Measurement and Analysis of Object Reflectance Spectra," Color Research and Application, vol. 19, no. 1, pp. 4-9, February 1994, the contents of which are incorporated by reference herein. The eigenvectors in Table 1 were calculated without subtracting the mean vector. As shown in Table 1, each eigenvector is based on a sampling from 400 nm to 700 nm in 10 nm intervals, which yields 31 samples per eigenvector.

TABLE 1

Eigenvectors

| Wavelength (nm) | VECTORS | | | | | |
|---|---|---|---|---|---|---|
| | $1^{st}$ | $2^{nd}$ | $3^{rd}$ | $4^{th}$ | $5^{th}$ | $6^{th}$ |
| 400 | 0.0745 | −0.1148 | 0.1126 | 0.0951 | −0.1663 | 0.4522 |
| 410 | 0.1038 | −0.1727 | 0.1619 | 0.147 | −0.224 | 0.4069 |
| 420 | 0.1214 | −0.2054 | 0.1875 | 0.1667 | −0.2356 | 0.1882 |
| 430 | 0.1268 | −0.2181 | 0.1949 | 0.1596 | −0.1939 | 0.0336 |
| 440 | 0.1289 | −0.2266 | 0.1962 | 0.1427 | −0.1291 | −0.0786 |
| 450 | 0.13 | −0.2329 | 0.1941 | 0.1171 | −0.0591 | −0.1432 |
| 460 | 0.1312 | −0.2357 | 0.1825 | 0.0814 | 0.0124 | −0.1868 |
| 470 | 0.1347 | −0.2385 | 0.1639 | 0.0253 | 0.0964 | −0.2209 |
| 480 | 0.1376 | −0.2376 | 0.1329 | −0.0478 | 0.1788 | −0.2086 |
| 490 | 0.1423 | −0.2334 | 0.0879 | −0.1345 | 0.2534 | −0.1593 |
| 500 | 0.1484 | −0.2221 | 0.0255 | −0.2166 | 0.2863 | −0.0538 |
| 510 | 0.1586 | −0.2021 | −0.0629 | −0.2839 | 0.2459 | 0.0931 |
| 520 | 0.1703 | −0.1711 | −0.1681 | −0.2981 | 0.1104 | 0.1889 |
| 530 | 0.1788 | −0.1385 | −0.2488 | −0.2546 | −0.0504 | 0.1766 |
| 540 | 0.1851 | −0.1093 | −0.2897 | −0.1788 | −0.1539 | 0.1176 |
| 550 | 0.1908 | −0.0819 | −0.3043 | −0.0849 | −0.1928 | 0.0468 |
| 560 | 0.1956 | −0.0523 | −0.304 | 0.0331 | −0.1823 | −0.0445 |
| 570 | 0.2 | −0.0226 | −0.2929 | 0.1537 | −0.1372 | −0.1399 |
| 580 | 0.2048 | 0.0083 | −0.2624 | 0.2608 | −0.0678 | −0.1769 |
| 590 | 0.2095 | 0.0475 | −0.2001 | 0.3148 | 0.0503 | −0.1486 |
| 600 | 0.2126 | 0.0915 | −0.1173 | 0.3076 | 0.1622 | −0.068 |
| 610 | 0.2137 | 0.1324 | −0.0344 | 0.2361 | 0.2166 | 0.0331 |
| 620 | 0.2133 | 0.1624 | 0.0324 | 0.1409 | 0.2236 | 0.123 |
| 630 | 0.2137 | 0.18 | 0.0738 | 0.0752 | 0.2077 | 0.1685 |
| 640 | 0.2145 | 0.1904 | 0.1034 | 0.0265 | 0.175 | 0.1746 |
| 650 | 0.2151 | 0.1962 | 0.1292 | −0.0216 | 0.1184 | 0.1488 |
| 660 | 0.2154 | 0.1997 | 0.147 | −0.0723 | 0.0408 | 0.0981 |
| 670 | 0.2153 | 0.2027 | 0.1622 | −0.1305 | −0.0436 | 0.0299 |
| 680 | 0.2146 | 0.2073 | 0.1655 | −0.1884 | −0.1354 | −0.0681 |
| 690 | 0.2135 | 0.2135 | 0.1564 | −0.2249 | −0.243 | −0.1861 |
| 700 | 0.2077 | 0.2156 | 0.1386 | −0.2383 | −0.3662 | −0.3052 |

The eigenvectors are weighted by the corresponding eigenvector coefficients to reconstruct the spectral reflectance for the hue name. In the example embodiment, six eigenvectors are determined, but in other embodiments, any number of eigenvectors suitable for reconstructing the measured spectral reflectance with a high degree of accuracy can be determined.

Therefore, for each hue name stored in the spectral signature LUT, the corresponding spectral signature representation is a set six eigenvector coefficients, one coefficient for each of the six determined eigenvectors. An example spectral signature LUT is shown in Table 2.

Eigenvector Coefficients

TABLE 2

Spectral Signature LUT

| HUE NAME | $1^{st}$ | $2^{nd}$ | $3^{rd}$ | $4^{th}$ | $5^{th}$ | $6^{th}$ |
|---|---|---|---|---|---|---|
| dark skin | 0.6955 | 0.2243 | −0.1266 | −0.061 | 0.0793 | −0.0225 |
| light skin | 2.2909 | 0.4342 | 0.3109 | −0.1486 | 0.0235 | −0.0342 |
| blue sky | 1.0336 | −0.6459 | 0.2207 | 0.0991 | −0.0745 | 0.082 |
| Foliage | 0.6068 | −0.0003 | −0.087 | −0.1199 | −0.1019 | −0.0246 |
| blue flower | 1.7747 | −0.391 | 0.6376 | −0.1013 | −0.2677 | −0.0316 |
| bluish green | 1.8886 | −0.929 | −0.1229 | −0.2791 | 0.0625 | −0.0089 |
| Orange | 1.9149 | 0.9816 | 0.0901 | 0.136 | −0.0071 | −0.077 |
| purpulish blue | 0.8562 | −0.6198 | 0.4412 | 0.1043 | −0.1081 | −0.005 |
| moderate red | 1.7421 | 0.8122 | 0.5521 | −0.0132 | 0.0714 | 0.0883 |
| Purple | 0.6907 | 0.0228 | 0.3655 | −0.0558 | −0.2428 | 0.044 |
| yellow green | 1.7807 | 0.0737 | −0.5929 | −0.2549 | −0.0473 | 0.0346 |
| orange yellow | 2.392 | 0.9645 | −0.1752 | 0.0852 | −0.0612 | −0.0655 |
| Blue | 0.5108 | −0.5213 | 0.3547 | 0.1196 | −0.0557 | −0.0836 |
| Green | 0.793 | −0.2769 | −0.4024 | −0.1936 | −0.0335 | 0.0666 |
| Red | 1.5581 | 1.1104 | 0.691 | −0.3183 | −0.0426 | 0.0523 |
| yellow | 2.9879 | 0.9397 | −0.4645 | −0.1619 | 0.0412 | 0.0109 |
| Magenta | 2.1258 | 0.6559 | 1.0118 | −0.1556 | −0.2167 | 0.1393 |
| Cyan | 1.0058 | −0.9111 | 0.227 | −0.1768 | 0.1397 | −0.0486 |
| White | 4.7493 | −0.8394 | 0.3134 | 0.0091 | −0.0352 | −0.0531 |
| gray 8 | 3.1311 | −0.6006 | 0.2267 | 0.0554 | −0.0636 | 0.0541 |
| gray 6.5 | 1.9199 | −0.3893 | 0.1441 | 0.0481 | −0.0513 | 0.0705 |
| gray 5 | 1.0893 | −0.2239 | 0.0833 | 0.0301 | −0.032 | 0.0502 |
| gray 3.5 | 0.4962 | −0.1092 | 0.0393 | 0.0152 | −0.0172 | 0.0273 |
| Black | 0.1821 | −0.041 | 0.0175 | 0.0049 | −0.0078 | 0.0118 |

As shown in Table 2, the spectral signature representations for each hue name are represented by a set of six eigenvector coefficients.

In the example embodiment, each spectral signature obtained by using the image sensor 14 is transformed into a set of six eigenvector coefficients that correspond to the six eigenvectors represented in the spectral signature LUT of Table 2. In the example embodiment, each obtained spectral signature is transformed into the set of six eigenvector coefficients by applying a predetermined transformation to the obtained spectral signature. In the example embodiment, the transformation is built by using pseudo-inverse operation from spectral signatures to coefficients of pre-determined eigenvectors.

For example, if the six coefficients determined by applying the transformation to the obtained spectral signature are (1.56, 1.11, 0.69, −0.32, −0.04, 0.05), then the database search using spectral signature LUT of Table 2 will retrieve the hue name "red", since the coefficients for the obtained spectral signature match the eigenvector coefficients for "red" as specified in the spectral signature LUT. In the example embodiment, canonical correlation analysis is performed to determine a correlation between eigenvector coefficients for an obtained spectral signature and eigenvector coefficients specified in the spectral signature LUT. The hue name that corresponds with the eigenvector coefficient in the LUT that correlates with the eigenvector coefficients for the obtained spectral signature is retrieved. By performing canonical correlation analysis, a correlation between eigenvector coefficients for an obtained spectral signature and eigenvector coefficients specified in the spectral signature LUT can be determined within certain tolerances in a case where there is not an exact match between eigenvector coefficients for the obtained spectral signature and the eigenvector coefficients specified in the spectral signature LUT.

After both the color scheme LUT has been retrieved and the hue names corresponding to the obtained spectral signatures have been retrieved, a lookup is performed in the color scheme LUT to obtain image capture adjustment values for brightness and saturation that indicate how brightness and saturation should be adjusted for each of the obtained hue names.

For example, if the color scheme LUT for Helsinki (801 of FIG. 8A) is retrieved based on the received geographic location, and the hue name "red" is retrieved from spectral signature LUT of Table 2 based on the obtained spectral signature coefficients (−3.69, 1.40, −0.84, 0.29, 0.31, 0.00), then image capture adjustment values "+10" and "−10%" for brightness and saturation (respectively) for the hue name "red" are obtained from the color scheme LUT 801 for Helsinki. In other words, based on the geographic location which corresponds to Helsinki, a color scheme is retrieved that indicates image capture adjustment to increase luminance for red by 10 units, and decrease saturation for red by 10%.

Figure 10:
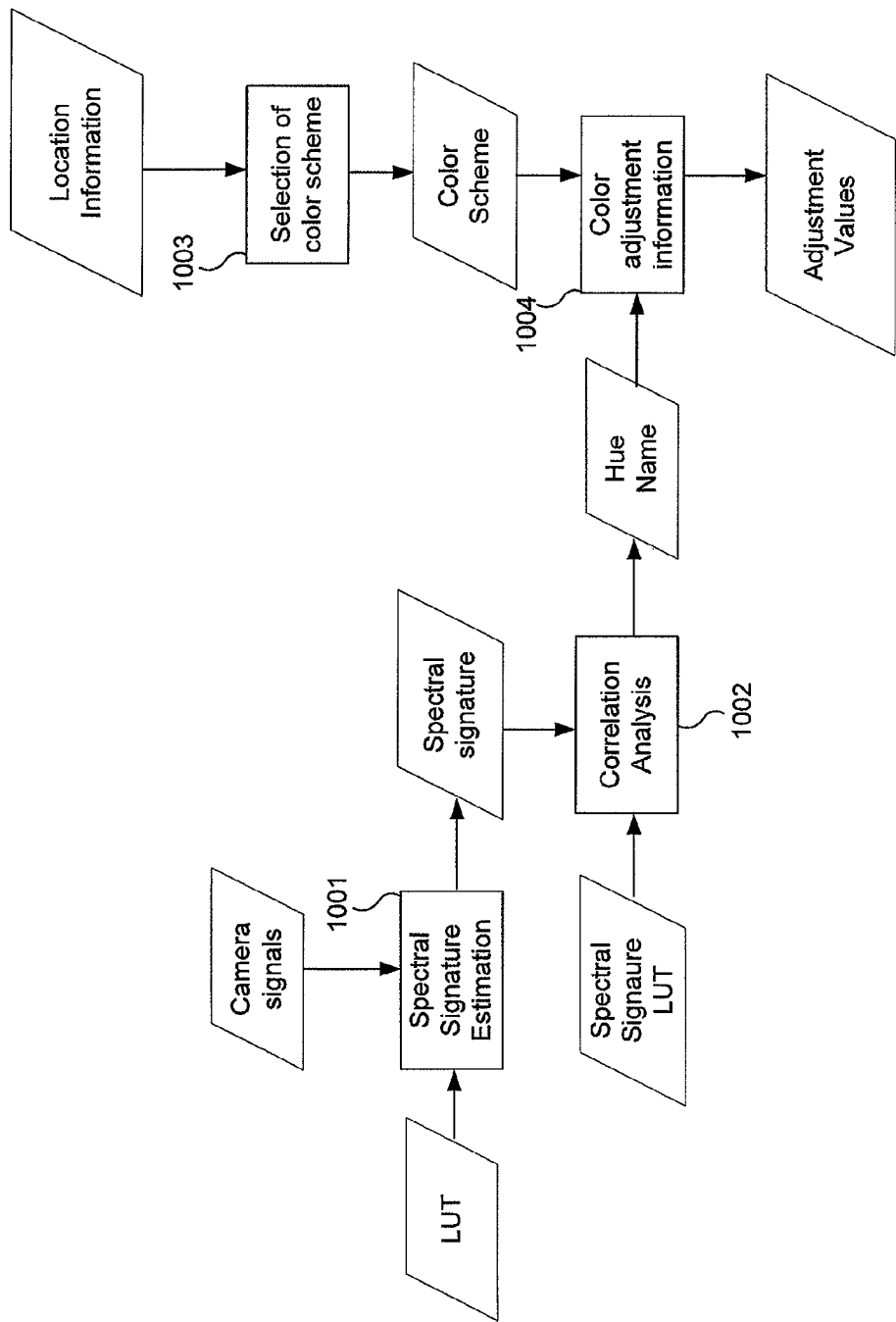
FIG. 10 is a flow diagram that describes how image capture adjustment values are obtained from the spectral signatures and geographic location according to an example embodiment.

Accordingly, color scheme LUT 801 of FIG. 8A includes representative hue names 802 and hue angles 803, and corresponding image capture adjustment values for brightness 804 and saturation 805 that indicate how brightness and saturation should be adjusted in relation to a baseline, according to local preferences in Helsinki FIG. 10 is a flow diagram that describes how image capture adjustment values are obtained from the spectral signatures obtained in steps S501 to S506 and the geographic location received in step S507. As shown in step S1001, spectral signatures are obtained, as will be described below in the detailed description of steps S501 to S506. In step S1002, eigenvector coefficients are determined for obtained spectral signatures, and canonical correlation analysis is performed to determine a correlation between the eigenvector coefficients of obtained spectral signatures and eigenvector coefficients specified in the spectral signature LUT stored in the database to obtain corresponding hue names. In step S1003, a database search is performed using the position coordinates received by the location sensor 211 to retrieve the corresponding color scheme LUT as specified in the geographic location LUT that is stored in the database. In step S1004, a lookup is performed in the color scheme LUT to obtain image capture adjustment values for brightness and saturation that indicate how brightness and saturation should be adjusted for each of the obtained hue names.

Thus, in the example embodiment described with respect to FIGS. 6 to 10, the color scheme specifies adjustment values to adjust brightness and saturation of colors according to local preferences of a geographic region in which digital camera 100 is located.

In another example embodiment, rather than correlate geographic location of geographic regions (e.g., Helsinki, Accra) with color schemes, the geographic location LUT correlates geographic location of general types of locations, such as known locations of beaches and known locations with snow, with color schemes. These correlations in the database can be configured based on user-selection, or they can be automatically configured. For example, if the received GPS position coordinates indicate that the current location is near a beach, a color scheme associated with beach photography is retrieved.

In another example embodiment, the geographic location LUT correlates geographic location of specific locations, such as locations of points of interest (e.g., the Louvre). These correlations in the database can be configured based on user-selection, or they can be automatically configured. For example, if the received GPS position coordinates indicate that the current location is at the Louvre, a color scheme associated with photography at the Louvre is retrieved.

In another example embodiment, as shown in FIG. 11, the database stores a geographic location look-up-table (LUT) 1101 that correlates geographic location 1102 and a season 1103 (e.g., fall, winter, spring, summer) to color schemes 1104. As shown in FIG. 11, seasons 1103 are represented by a range of dates (e.g., June-August for summer). A current date is received, and the position coordinates are received by the location sensor 211. A database search is performed using the current date and the geographic location LUT to retrieve the color scheme that corresponds to the current date and the current position coordinates. For example, if the current date is Jul. 4, 2011, and the GPS position coordinates received by the location sensor are "65 degrees N/30 degrees E", then the database search will retrieve the color scheme for Summer in Helsinki, since the current date is within the date range "June-August" for summer, and the received GPS position coordinates are within the range "60-75 degrees N/20-40 degrees E" which corresponds to the color scheme for summer in Helsinki. These correlations in the database can be determined based on user-selection, or they can be automatically determined.

In another example embodiment, as shown in FIG. 12, the database stores a geographic location look-up-table (LUT) 1201 that correlates geographic location 1202 and a time of day 1203 (e.g., night or day) to color schemes 1204. As shown in FIG. 12, time of day 1203 is represented by a range of times (e.g., 10:00 pm to 12:00 am for night). A current time is received, and the position coordinates are received by the location sensor 211. A database search is performed using the current time and the geographic location LUT to retrieve the color scheme that corresponds to the current time and the current position coordinates. For example, if the current time is 11:35 pm, and the GPS position coordinates received by the location sensor are "65 degrees N/30 degrees E", then the database search will retrieve the color scheme for night time in Helsinki, since the current time is within the time range "10:00 pm to 12:00 am" for night, and the received GPS position coordinates are within the range "60-75 degrees N/20-40 degrees E" which corresponds to the color scheme for Helsinki. These correlations in the database can be determined based on user-selection, or they can be automatically determined.

In another example embodiment, as shown in FIG. 13, the database stores a geographic location look-up-table (LUT) 1301 that correlates geographic location 1302 and a specific date 1303 (e.g., St. Patrick's Day) to color schemes 1304. A current date is received, and the position coordinates are received by the location sensor 211. A database search is performed using the current date and the geographic location LUT to retrieve the color scheme that corresponds to the current date and the current position coordinates. For example, if the current date is Mar. 17, 2011, and the GPS position coordinates received by the location sensor are "65 degrees N/30 degrees E", then the database search will retrieve the color scheme for St. Patrick's Day in Helsinki, since the current day is St. Patrick's Day, and the received GPS position coordinates are within the range "60-75 degrees N/20-40 degrees E" which corresponds to the color scheme for St. Patrick's Day in Helsinki. Such a color scheme might tend to emphasize the color green, for example. These correlations in the database can be determined based on user-selection, or they can be automatically determined.

In another example embodiment, the color scheme LUT correlates image capture adjustment values with specific types of objects or certain photographic subjects, e.g., clothes. In this embodiment, the spectral signature LUT correlates spectral signatures with material names. These correlations in the database can be configured based on user-selection, or they can be automatically configured. Identifying object materials from spectral signatures is described in detail in U.S. application Ser. No. 13/033,578, by Francisco Imai, entitled "Image Capture And Post-Capture Processing", the contents of which are incorporated by reference herein.

The material spectral signatures LUT is generated by measuring known objects using a spectrophotometer to determine spectral reflectance factors for the object. The measured spectral reflectance factors of each object are used to determine a representation of the spectral signature that corresponds to the material name of the object. The material names and associated spectral signature representations are stored in the material spectral signature LUT in correspondence with each other An example material spectral signature LUT is shown in Table 3.

Eigenvector Coefficients

TABLE 3

| Material Spectral Signature LUT | | | | | | |
|---|---|---|---|---|---|---|
| MATERIAL NAME | $1^{st}$ | $2^{nd}$ | $3^{rd}$ | $4^{th}$ | $5^{th}$ | $6^{th}$ |
| Almond | 2.248 | 0.47868 | 0.020451 | −0.13179 | 0.024426 | −0.08954 |
| Asphalt | 0.44851 | −0.03849 | 0.027077 | −0.00244 | −0.00949 | 0.007077 |
| Bamboo | 2.0054 | 0.57172 | 0.064729 | −0.16885 | −0.00058 | −0.11347 |
| Banana yellow (just turned) | 2.446 | 0.32422 | −0.46088 | 0.041729 | −0.10027 | 0.035873 |
| Barley seeds | 2.5948 | 0.020564 | 0.07933 | −0.08318 | −0.02274 | −0.03958 |
| Bay leaf | 0.78804 | 0.01319 | −0.09625 | −0.00958 | −0.0486 | −0.05219 |
| Black backpack | 0.18718 | 0.004584 | 0.034896 | −0.03042 | −0.03669 | −0.01784 |
| Brown leather (Bass saddle shoe) | 0.59787 | 0.15039 | 0.043259 | −0.01566 | −0.01761 | −0.02144 |
| Brown paper bag | 1.5813 | 0.26447 | 0.10099 | −0.09193 | −0.03474 | −0.04035 |
| Brown rice seeds | 2.0651 | 0.35005 | −0.07283 | −0.11183 | 0.047948 | −0.07853 |
| Brown suede (Bass saddle shoe) | 0.64818 | 0.14545 | 0.053119 | −0.05625 | −0.03166 | −0.02664 |
| Bush fern-like leaf | 0.22004 | −0.02359 | −0.08793 | −0.01924 | −0.05175 | −0.00384 |
| Bush leaf | 0.57719 | −0.00957 | −0.2496 | −0.02952 | −0.1158 | −0.02401 |
| Buttercup flower | 1.5108 | 0.55818 | −0.39381 | 0.045287 | −0.05071 | 0.002268 |
| Cabbage | 1.3455 | −0.0636 | −0.2945 | −0.06422 | −0.09034 | −0.00352 |
| Carrot | 2.0527 | 1.129 | 0.2311 | 0.17687 | 0.027571 | −0.08338 |
| Corn (raw) | 2.908 | 0.68183 | −0.23977 | −0.0306 | −0.11262 | 0.034388 |
| Corn husk | 0.68537 | −0.02822 | −0.2273 | −0.02715 | −0.07398 | −0.01916 |
| Cotton cloth -- Light gray | 1.8247 | −0.33684 | 0.14498 | 0.014864 | −0.0328 | −0.01379 |
| Cotton shirt -- Blue | 0.36565 | −0.10241 | 0.12264 | −0.04106 | −0.0835 | −0.03189 |
| Cucumber | 0.42937 | 0.007307 | −0.20283 | −0.03554 | −0.11898 | −0.0307 |
| Daisy -- White petals | 3.9263 | −0.46684 | 0.036922 | −0.14136 | 0.17519 | −0.30466 |
| Daisy -- Yellow center | 1.4471 | 0.60713 | −0.28028 | 0.084689 | −0.07886 | −0.03828 |
| Dark blue bandana | 0.24009 | −0.04088 | 0.11881 | −0.01936 | −0.07768 | −0.02405 |
| Dark blue cotton sweat pants | 0.24388 | −0.09421 | 0.095846 | −0.01621 | −0.05648 | −0.00233 |
| Dark blue jeans | 0.42215 | −0.20985 | 0.096309 | 0.012964 | −0.05729 | 0.006208 |
| Dark blue towel | 0.34333 | −0.05131 | 0.15142 | −0.06174 | −0.10662 | −0.03985 |
| Denim | 0.4812 | −0.10659 | 0.11754 | −0.03292 | −0.09461 | −0.00988 |
| Fabric -- Dark brown | 0.87636 | 0.10725 | 0.10547 | −0.07676 | −0.10642 | −0.04225 |
| Fabric -- Pink | 2.2219 | 0.2728 | 0.66873 | −0.05303 | −0.24787 | 0.086271 |
| Fabric -- White | 4.4845 | −0.44775 | 0.23154 | −0.01953 | −0.02892 | −0.08378 |
| Fabric -- Brown | 1.444 | 0.47087 | 0.19832 | −0.26844 | −0.23921 | −0.25816 |
| Fabric -- Green | 0.21129 | −0.03123 | 0.020476 | −0.03976 | −0.02005 | −0.01451 |
| Faded jeans | 1.3239 | −0.51943 | 0.2087 | 0.029778 | −0.11818 | −0.00433 |
| Grass | 0.34006 | 0.028637 | −0.06086 | −0.01035 | −0.03091 | −0.0095 |
| Green aqua-sock | 1.2772 | −0.04727 | −0.17227 | −0.07084 | 0.063785 | 0.024862 |

TABLE 3-continued

Material Spectral Signature LUT

| MATERIAL NAME | 1st | 2nd | 3rd | 4th | 5th | 6th |
|---|---|---|---|---|---|---|
| Green key ring (plastic) | 0.69369 | 0.56227 | 0.33878 | −0.15668 | 0.002305 | 0.042873 |
| Green pepper | 0.40112 | 0.022655 | −0.19696 | −0.04959 | −0.11927 | −0.03926 |
| Green snow-hat | 1.6089 | 0.22586 | −0.28936 | −0.53539 | −0.52161 | −0.23557 |
| Green sport shirt | 0.54039 | −0.40961 | −0.00631 | −0.19557 | 0.12083 | −0.03671 |
| Gum -- Green | 3.6053 | −0.05513 | −0.2701 | −0.31167 | 0.049809 | 0.009885 |
| Hair -- Black | 0.08478 | −0.00777 | 0.005972 | −0.00233 | −0.00073 | −0.00249 |
| Hair -- Black | 0.084543 | −0.01094 | 0.007916 | −0.00115 | −0.00626 | 0.001892 |
| Hair -- Brown | 0.34419 | 0.0588 | 0.037272 | −0.02614 | −0.01572 | −0.01285 |
| Hair -- Brown | 0.2758 | 0.10437 | 0.029719 | −0.02834 | −0.01349 | −0.01447 |
| Hair -- Gray/Black | 0.14329 | 0.003834 | 0.016055 | −0.00414 | −0.01388 | 0.001519 |
| Hair -- Red | 0.72194 | 0.269 | 0.084694 | −0.06525 | −0.03641 | −0.03534 |
| Highlighter pen (plastic) | 0.41918 | 0.087488 | 0.067636 | −0.04279 | −0.03881 | −0.01544 |
| Kiwi outside | 0.58834 | 0.17828 | 0.019411 | −0.03581 | −0.05738 | −0.04925 |
| Leather brown belt | 0.24506 | 0.030187 | 0.024986 | 0.00113 | −0.00381 | −0.00231 |
| Lemon skin | 2.5104 | 0.83944 | −0.41787 | −0.05553 | 0.005546 | −0.01914 |
| Lentil seeds | 1.2042 | 0.23173 | 0.030351 | −0.0544 | −0.0466 | −0.03554 |
| Lettuce | 0.70717 | −0.05958 | −0.1864 | −0.02803 | −0.0877 | −0.00457 |
| Light blue towel | 0.95035 | −0.61999 | 0.2597 | −0.10024 | −0.07087 | −0.10503 |
| Light green towel | 2.4197 | −0.9152 | 0.45969 | −0.08708 | −0.09808 | −0.20966 |
| Locust leaf | 0.39274 | −0.02943 | −0.15777 | −0.01402 | −0.07574 | −0.01065 |
| Maple dark green leaf | 0.33156 | −0.03363 | −0.05128 | −0.01427 | −0.04975 | −0.00134 |
| Marigold -- Orange | 1.6668 | 1.0136 | 0.023747 | 0.16219 | −0.02551 | −0.09289 |
| Marigold -- Yellow | 1.9645 | 0.80976 | −0.31841 | 0.021183 | −0.05938 | −0.03446 |
| Oak leaf | 0.22562 | −0.0278 | −0.07138 | −0.01526 | −0.05035 | −0.00488 |
| Pancake | 0.7992 | 0.34161 | 0.13556 | −0.112 | −0.07854 | −0.05604 |
| Peach skin -- Red | 1.2372 | 0.68286 | 0.38187 | −0.1577 | −0.07947 | −0.04681 |
| Peach skin -- Yellow | 2.2178 | 0.72096 | −0.11546 | 0.020835 | −0.06049 | −0.03016 |
| Pear | 1.3148 | 0.10527 | −0.37666 | −0.005 | −0.07626 | −0.04189 |
| Pine Needles | 0.49853 | −0.03893 | −0.06421 | −0.02878 | −0.00902 | −0.03486 |
| Pink flower (Plant had red leaves) | 1.7399 | 0.52795 | 0.51676 | 0.012944 | 0.073764 | −0.05852 |
| Prune (with specularities) | 0.17515 | −0.01537 | 0.01995 | −0.0042 | −0.01169 | −0.00067 |
| Purple EZ-rig (plastic) | 1.2957 | −0.38204 | 0.6525 | 0.058941 | −0.28694 | 0.072135 |
| Raincoat -- Blue | 0.4321 | −0.35363 | 0.16485 | −0.03997 | −0.01176 | −0.09655 |
| Raincoat -- Magenta/red | 1.3501 | 0.78265 | 0.75738 | −0.37798 | −0.34449 | −0.06234 |
| Raincoat -- Yellow | 2.2619 | 0.81174 | −0.25005 | 0.070224 | −0.03246 | −0.01037 |
| Red bush leaf | 0.30726 | 0.047438 | 0.033138 | −0.00632 | −0.03242 | −0.02979 |
| Red flower (Plant had red leaves) | 1.7399 | 0.52795 | 0.51676 | 0.012944 | 0.073764 | −0.05852 |
| Red letters on t-shirt | 1.4735 | 0.9715 | 0.5759 | −0.17153 | 0.032795 | 0.053165 |
| Red Maple leaf | 0.24702 | 0.019788 | 0.040147 | −0.01023 | −0.02959 | −0.01345 |
| Red rubber (Bass saddle shoe) | 0.71502 | 0.24417 | 0.1259 | −0.01164 | 0.042864 | 0.012496 |
| Red towel | 0.96424 | 0.55563 | 0.41216 | −0.18718 | −0.18741 | −0.091 |
| Ripe brown banana | 0.87636 | 0.10725 | 0.10547 | −0.07676 | −0.10642 | −0.04225 |
| Sand | 1.9016 | 0.1234 | −0.00097 | −0.03405 | 0.001334 | −0.03184 |
| Sesame seeds | 2.7385 | 0.21917 | 0.011378 | −0.16346 | 0.04569 | −0.0876 |
| Silver Maple leaf | 0.34824 | −0.03215 | −0.12643 | −0.02576 | −0.07168 | −0.00867 |
| Skin -- Asian | 1.7773 | 0.47846 | 0.26506 | −0.17706 | 0.036142 | −0.03536 |
| Skin -- Caucasian (Dark, with makeup) | 1.8485 | 0.5009 | 0.22981 | −0.16177 | 0.033417 | −0.03624 |
| Skin -- Caucasian (Light) | 2.1716 | 0.4569 | 0.31015 | −0.17371 | 0.058331 | −0.00539 |
| Skin -- Caucasian (with makeup) | 1.7276 | 0.40888 | 0.24511 | −0.1148 | 0.039785 | −0.01544 |
| Skin -- East Indian (Dark) | 1.1766 | 0.3608 | 0.16333 | −0.12184 | −0.02218 | −0.0368 |
| Skin -- East Indian (Light) | 1.5764 | 0.46541 | 0.22977 | −0.15703 | 0.018645 | −0.03142 |
| Small magenta flower | 2.7536 | −0.06483 | 0.11248 | −0.11626 | 0.096238 | −0.17282 |
| Sneakers -- Orange | 0.79345 | 0.45093 | 0.25461 | 0.072895 | 0.046671 | 0.037675 |
| Sneakers -- White (dirty leather) | 3.1858 | −0.25209 | 0.11995 | −0.04984 | −0.01604 | −0.02222 |
| Soil | 0.19378 | 0.024802 | 0.021212 | −0.01298 | −0.01144 | −0.00432 |
| Straw from broom | 1.6014 | 0.37535 | −0.01695 | −0.15028 | 0.026789 | −0.11348 |
| Suede -- Gray | 1.5635 | −0.0868 | 0.24881 | −0.16706 | −0.16156 | −0.0461 |
| Sugar (White) | 4.2785 | −0.74214 | 0.29307 | 0.044132 | −0.10391 | 0.15717 |
| Swiss army knife (plastic) | 2.6443 | 0.18183 | −0.79567 | −0.40172 | −0.10779 | 0.21749 |

TABLE 3-continued

Material Spectral Signature LUT

| MATERIAL NAME | 1st | 2nd | 3rd | 4th | 5th | 6th |
|---|---|---|---|---|---|---|
| Synthetic cloth blue (with surfing harness) | 0.81233 | −1.0027 | 0.32198 | −0.1424 | 0.15875 | −0.18168 |
| Synthetic cloth red (with surfing harness) | 1.3386 | 1.1021 | 0.73114 | −0.47927 | −0.21388 | −0.04287 |
| Table cloth -- White | 4.2782 | −0.58113 | 0.25978 | 0.006351 | −0.04113 | −0.05591 |
| Tree leaf | 0.31775 | −0.01741 | −0.14322 | −0.02508 | −0.06097 | −0.00822 |
| Vine leaf | 0.56289 | −0.0198 | −0.18131 | −0.00363 | −0.08914 | −0.02132 |
| Walnut | 1.7145 | 0.44138 | 0.11512 | −0.14125 | −0.03908 | −0.07958 |
| Weed leaf | 0.70093 | −0.09402 | −0.10916 | −0.02122 | −0.05005 | −0.02381 |
| Weed tree leaf | 0.32194 | −0.04375 | −0.07562 | −0.01086 | −0.05223 | −0.00533 |
| Wheat bread | 2.2634 | 0.33061 | 0.082027 | −0.12434 | −0.02195 | −0.05919 |
| Wheat bread crust | 1.0524 | 0.46319 | 0.15748 | −0.12277 | −0.08313 | −0.06111 |
| White sport shirt | 3.8006 | −0.66214 | 0.32783 | 0.011519 | −0.09331 | −0.06811 |
| White T-shirt | 4.2181 | −0.76193 | 0.35174 | −0.06083 | −0.02456 | −0.24577 |
| White/gray wool sock | 2.3954 | −0.2477 | 0.12335 | −0.02957 | −0.03015 | 0.016726 |
| Wood -- Maple | 2.0568 | 0.32248 | 0.10208 | −0.11631 | −0.01041 | −0.07974 |
| Wood -- Oak | 1.8629 | 0.3415 | 0.061186 | −0.10074 | −0.00299 | −0.07129 |
| Wood -- Pine | 2.1181 | 0.52331 | 0.079948 | −0.12757 | −0.01228 | −0.08713 |
| Wood -- Redwood | 1.3061 | 0.49817 | 0.17484 | −0.11378 | −0.06789 | −0.05457 |
| Wood -- Walnut | 1.0016 | 0.22444 | 0.10643 | −0.07559 | −0.04664 | −0.04013 |
| Wood -- Worm | 1.1858 | 0.44314 | 0.17343 | −0.12778 | −0.08585 | −0.05803 |
| Yarn -- Yellow | 3.3713 | 0.28381 | −0.29596 | −0.27466 | 0.18287 | −0.01894 |

Correlation of materials with spectral signatures is discussed in M. J. Vrhel, R. Gershon, and L. Iwan, "The Measurement and Analysis of Object Reflectance Spectra," Color Research and Application, vol. 19, no. 1, pp. 4-9, February 1994, the contents of which are incorporated by reference herein.

As shown in Table 3, the spectral signature representations for each material name are represented by a set of six eigenvector coefficients. In the example embodiment, each spectral signature obtained by using the image sensor 14 is transformed into a set of six eigenvector coefficients that correspond to the six eigenvectors represented in the material spectral signature LUT of Table 3. In the example embodiment, each obtained spectral signature is transformed into the set of six eigenvector coefficients by applying a predetermined transformation to the obtained spectral signature. In the example embodiment, the transformation is built by using pseudo-inverse calculation.

In this example embodiment, a database search is performed to retrieve material names corresponding to the spectral signatures obtained in steps S501 to S506 of FIG. 5, by using the material spectral signature LUT.

For example, if the six coefficients determined by applying the transformation to the obtained spectral signature are (0.54, −0.41, −0.01, −0.20, 0.12, −0.04), then the database search using the material spectral signature LUT of Table 2 will retrieve the material name "Green sport shirt", since the coefficients for the obtained spectral signature match the eigenvector coefficients for "Green sport shirt" as specified in the material spectral signature LUT. In the example embodiment, canonical correlation analysis is performed to determine a correlation between eigenvector coefficients for an obtained spectral signature and eigenvector coefficients specified in the material spectral signature LUT. The material name that corresponds with the eigenvector coefficient in the LUT that correlates with the eigenvector coefficients for the obtained spectral signature is retrieved. By performing canonical correlation analysis, a correlation between eigenvector coefficients for an obtained spectral signature and eigenvector coefficients specified in the material spectral signature LUT can be determined in a case where there is not an exact match between eigenvector coefficients for the obtained spectral signature and the eigenvector coefficients specified in the material spectral signature LUT.

After both the color scheme LUT has been retrieved and the material names corresponding to the obtained spectral signatures have been retrieved, a lookup is performed in the color scheme LUT to obtain image capture adjustment values for brightness and saturation that indicate how brightness and saturation should be adjusted for each of the obtained material names.

As an example, a color scheme used for fashion photography might correlate spectral signatures to corresponding image capture adjustment values to emphasize clothing that has colors that are in trend for a given region, as determined by the geographic location and the spectral signatures. If dark green clothes are currently in trend in Europe, then a color scheme that corresponds to a European location, as determined by the geographic location, might correlate spectral signatures for dark green cloth to image capture adjustment values to enhance image capture for such spectral signatures.

Returning to FIG. 5, a detailed description of the steps in FIG. 5 will now be provided. In step S501, system controller 50 controls spatial electronic mask generator 76 to set-up an initial state for a pixel-by-pixel basis spatial electronic voltage mask 75 that is going to modulate the amplitude and spectral selectivity of image sensor 14. The electronic mask 75 can control amplitude and spectra tuning for each pixel. The initial state for the pixel-by-pixel basis spatial mask 75 is given by electronic voltages that has some assumptions about illumination and material properties of the scene and is usually a pre-designated setting determined in advance such as by a calibration procedure that is made in the imaging system assembly line. The default capture parameter 17 includes this initial state for the pixel-by-pixel basis spatial mask 75. In the example embodiment, this capture parameter 17 has a high number of spectral components, e.g., five or more spectral components.

Figure 15:
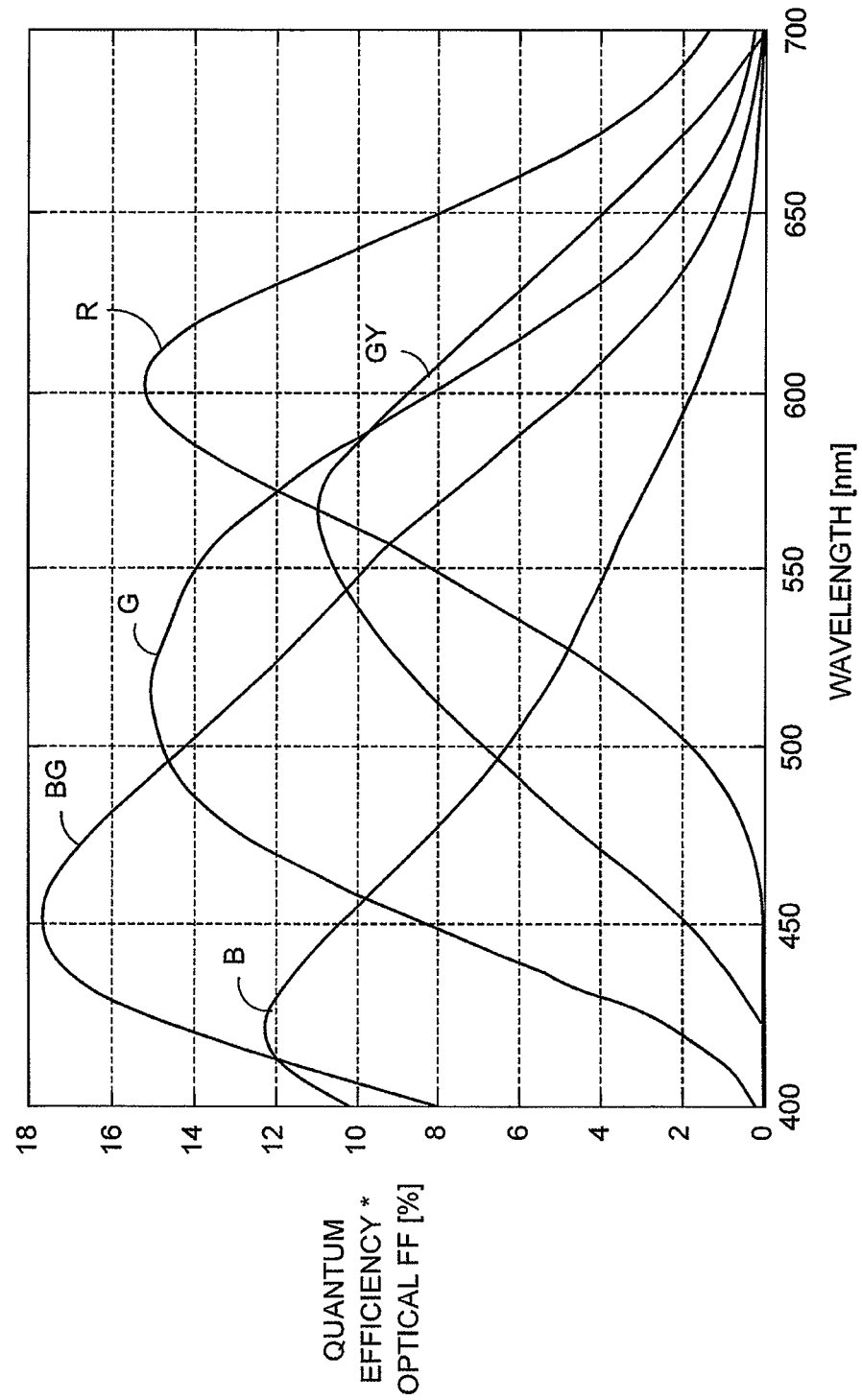
FIG. 15 is an example of a capture parameter for spectral sensitivities of pixels of the image sensor.

FIG. 14 shows one possible arrangement of pixels in the image sensor 14. FIG. 14 is a conceptual illustration of color channels of each pixel in the image sensor 14. As shown in FIG. 14, each pixel has five channels. In the example embodiment, each pixel has a red-like channel (R), a green-yellow-like channel (GY), a green-like channel (G), a blue-green-like channel (BG), and a blue-like channel (B). Thus, the default capture parameter 17 has five spectral components. The spectral sensitivities of each pixel are shown in FIG. 15. In the example embodiment, and as shown in FIG. 15, the default capture parameter 17 has sensitivities centered in wavelengths which divide the visible spectrum of light with substantially equal levels of sensitivity for each spectral component, i.e., each color channel. In other embodiments, each pixel can have color channels having other sensitivities. The depiction of the color channels of the image sensor are for ease of illustration, and is not indicative of actual number of spectral components, sensitivities and number of pixels of the image sensor.

Figure 16:
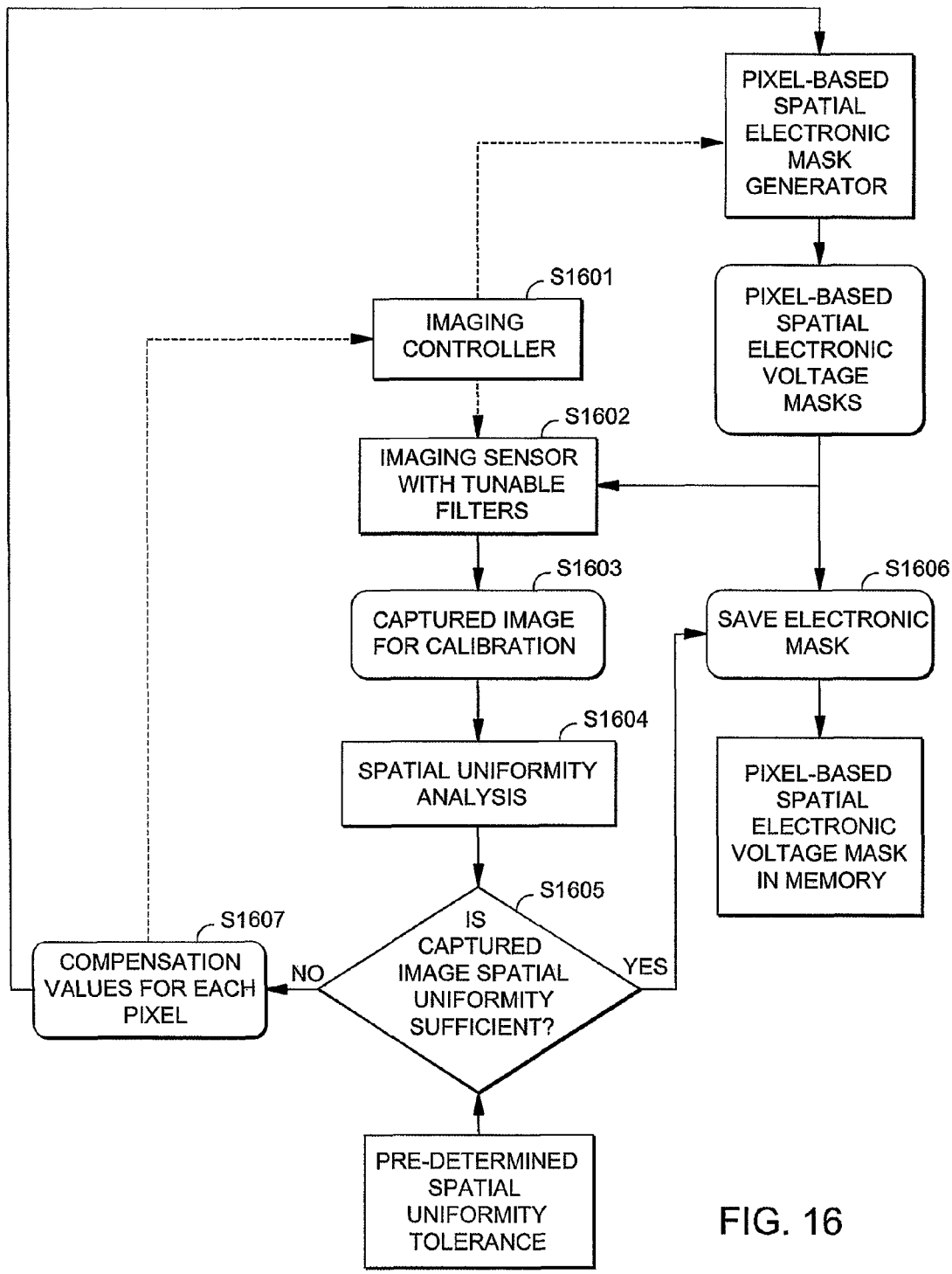
FIG. 16 shows an adaptive method to determine initial state pixel-based spatial electronic voltage mask.

One possible example for selection of an initial state for the electronic mask 75 is shown in FIG. 16, which shows an adaptive method to determine initial state pixel-based spatial electronic voltage mask 75. In this example, one possible setting is by adjusting the voltage in the initial state to produce uniform neutral response for a perfectly uniform and diffuse grey card under D50 illumination. Note that in actual imaging sensors there are non-uniformities in the response of individual pixels due to manufacturing tolerances and the optics used with the sensor will further produce non-uniformities in color and sensitivity. Therefore the voltage values generated for the pixel-by-pixel basis spatial electronic mask are not the same for all pixels, but they ordinarily have values that produce the same image data under the calibration conditions described above. By providing a system for pixel-by-pixel calibration of a tunable imaging sensor it is possible to: (a) compensate for non-uniformities in sensitivity and spectral response in the sensor due to manufacturing; and (b) compensate for non-uniformities in sensitivity and spectral response due to optical aberrations and distortions.

As shown in FIG. 16, all values of the pixel-based spatial electronic voltage mask 75 are set to same default factory value. In step S1601, the system controller 50 controls the image sensor 14 to an initial state mask and captures a spectral image for calibration (steps S1602 and S1603). In step S1604, spatial uniformity analysis is performed and if in step S1605 the captured image spatial uniformity is sufficient according to a pre-determined spatial uniformity tolerance, then in step S1606 the pixel-based spatial electronic voltage masks 75 are saved in the memory.

If the spatial uniformity of the captured image for calibration is not within specified tolerance, then in step S1607 a compensation value is calculated for each pixel and sent to the pixel-based spatial electronic mask generator 76 that creates a new pixel-based spatial electronic voltage mask. Then, in an iterated repetition of step S1601, the imaging controller then sends command to the image sensor 14 to capture a new calibration spectral image and the captured spectral image for calibration is analyzed for spatial uniformity. This iterative process is repeated until spatial uniformity of the captured spectral image is within the specified tolerance.

The electronic mask 75 for the initial state can be stored in a memory unit once the imaging system is calibrated and it is used every time the imaging system is turned on. The calibration procedure can be repeated for different lenses and illuminants and the calibration saved in the memory unit 56.

Returning to FIG. 5, in steps S502 and S503, the system controller 50 sends a command to tune the image sensor 14 in accordance with the default capture parameter 17 and capture a spectral image. In the example embodiment, the default capture parameter 17 corresponds to the signals to produce the arrangement of pixels in the image sensor shown in FIG. 14, such that the image sensor 14 has color channels for five different spectral sensitivities in accordance with FIG. 15, and thus has five spectral components.

In step S504, the scene property analysis module 77 determines whether the captured spectral image is the final image. In the example embodiment, the scene property analysis module 77 determines whether the captured spectral image is the final image based on a user input. For example, if the shutter 310 (of FIG. 3) is half-pressed, then it is determined that the shooting mode is an analysis mode, and if the shutter 310 is full-pressed, then it is determined that the shooting mode is not the analysis mode. If the spectral image was captured in the analysis mode, then it is not the final image.

If the scene property analysis module 77 determines that the captured image is the final image ("YES" in step S504), then the captured spectral image is stored (step S512).

If the scene property analysis module 77 determines that the captured image is not final image ("NO" in step S504), then processing proceeds to step S505. In step S505, the scene property analysis module 77 analyzes the captured spectral image. In particular, the digital signal for each channel in each pixel is analyzed to determine the spectral signature for each pixel. As described above, the image sensor 14 is tuned such that each pixel has five channels with sensitivities centered in wavelengths which divide the visible spectrum of light with substantially equal levels of sensitivity for each channel.

In particular, in the example embodiment in which each pixel has five channels, each pixel is integrated to produce five digital signals, one signal for each channel. As described above, each channel is tuned to a spectral band within the visible spectrum. Therefore, the digital signal for each channel corresponds to a respective spectral band within the visible spectrum.

The digital signal for each channel is represented as a digital count level. The range of digital count levels is determined by the imaging sensor. For example, for an image sensor with 10-bit acquisition capabilities for each channel, the digital count level would range from 0 units to 1024 units, wherein a channel will have a signal reading of 1024 units when the channel is saturated.

For example, a pixel in a region with an orange color would have a digital signal reading as follows: Blue channel: 40 units; Blue-Green channel: 60 units; Green channel: 250 units; Green-Yellow channel: 850 units; Red channel: 940 units. This reading can be represented in a 5×1 matrix as follows (40, 60, 250, 850, 940).

The digital count level for each channel is converted to a set of numbers that can be related to a pre-determined set of eigenvectors. Thus, the signals produced by each pixel are converted into a set of numbers for each spectral band represented by the pixel, as determined by the tuning parameters for the pixel. This set of numbers, calculated by a transformation derived using a calibration procedure, one for each tuned spectral band, is the spectral signature of the pixel.

For example, if the digital count levels for a pixel in a region convert to a set of numbers RB, RBG, RG, RGY and RR for the Blue, Blue-Green, Green, Green-Yellow, and Red channels (respectively), the spectral signature for the pixel is represented by the 5×1 matrix (RB, RBG, RG, RGY,RR).

In the example embodiment, the spectral signature for each pixel is determined by using a look up table (LUT) of predetermined spectral signatures that maps digital count levels for each channel to a corresponding set of numbers. In mapping the digital count levels to spectral signatures, a threshold tolerance is applied to accommodate variability of spectral curves in one spectral signature category as well as effects of imaging system noise.

In other embodiments, the spectral signature for each pixel can be estimated by applying a predetermined transformation to the digital count levels for each channel of the pixel.

In step S506, contiguous pixels with similar spectral signatures are clustered into regions of the captured scene, wherein each such region shares similar spectral content that is dissimilar from spectral content in other regions of the scene.

In step S507, geographic location of the digital camera 100 is received from the location sensor 211.

In step S508, the determined spectral signature for each pixel and the received geographic location of the digital camera are used to retrieve color scheme data for the scene.

In the example embodiment, a database stores information which correlates geographic location to color schemes used to determine capture parameters, and a database search is performed to retrieve the color scheme that corresponds to the received geographic location. In the example embodiment, the database is located in a server that is external to the digital camera 100. In another example embodiment, the database is located in a network cloud that includes various computing devices, servers, storage devices, and the like. In yet another example embodiment, the database is located in the digital camera 100, such that the database is automatically updated.

In step S509, for each region determined in step S506, new spectral bands are determined in accordance with the color scheme retrieved in step S508, and the determined spectral signatures for each pixel.

For example, a retrieved color scheme may correlate spectral signatures for dark green cloth and unsaturated blue cloth to image capture adjustment values to enhance image capture for such spectral signatures. In such an example, new spectral bands are determined so as to enhance image capture in the regions determined in step S506 that correspond to the spectral signature of either dark green cloth or unsaturated blue cloth.

The determination of the new spectral bands for each region will now be described in more detail. As described above, the image sensor 14 is tuned in accordance with the default capture parameter 17 during capture of the preview spectral image, and the default capture parameter 17 corresponds to the signals to produce the arrangement of pixels in the image sensor shown in FIG. 14. Such an arrangement provides for imaging sensor sensitivities for five spectral bands that substantially equally divide the visible spectrum of light.

Therefore, the captured spectral image provides information for the following five spectral bands that divide the spectra delimited by 400 nm to 700 nm: 400-460 nm, 460-520 nm, 520-580 nm, 580-640 nm, 640-700 nm. The five new spectral bands are determined by weighting each of the spectral bands corresponding to the captured spectral image. The spectral bands are weighted according to the color scheme retrieved in step S508.

Weighting of the spectral bands will now be described in more detail. Each pixel in the spectral image has five channels: Blue, Blue-Green, Green, Green-Yellow, and Red, corresponding to the spectral bands 400-460 nm, 460-520 nm, 520-580 nm, 580-640 nm, 640-700 nm (respectively). For each region determined in step S510, weight values for the spectral bands 400-460 nm, 460-520 nm, 520-580 nm, 580-640 nm, 640-700 nm are determined based on the spectral signature for each pixel, and the color scheme retrieved in step S508. In the example embodiment, the weight values for a pixel are the image capture adjustment values that correspond to the respective spectral signature of the pixel, as determined by the color scheme.

Figure 17:
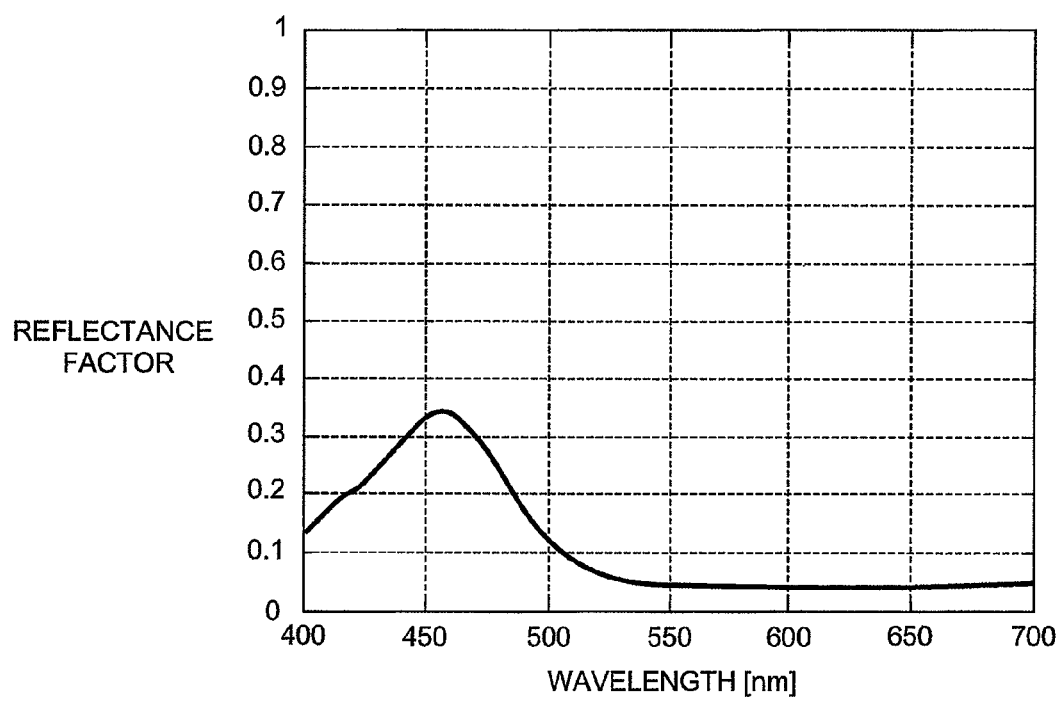
FIG. 17 illustrates spectral reflectance for a dark blue region of the captured spectral image.

For example, if the color scheme is for enhancing color in a region related to a dark blue cloth object having the spectral signature as shown in FIG. 17, the spectral band from 400-460 nm for a pixel in such a region would have a larger weight value as compared to weight values for other spectral bands. This would translate to voltage adjustment, as will be described below, that uses mostly the short-spectral channel to capture this data.

Returning to the description of FIG. 5, in step S509, a spectral mask is constructed for application to the image sensor 14. The spectral mask 75 is constructed by using the weight values determined for each of the multiple different regions. In particular, each weight value is converted into a corresponding voltage adjustment to be applied to the pixel-by-pixel basis spatial electronic voltage mask 75. Continuing with the preceding example, the weight values are converted into voltage adjustments to be applied to the portions of the electronic voltage mask corresponding to the Blue (B), Blue-Green (BG), Green (G), Green-Yellow (GY), and Red (R) channels of in the spectral image. In the example embodiment, the weight values are converted into voltage adjustments by using a pre-calculated LUT which maps weight values to voltage adjustments. In other embodiments, the weight values are converted into voltage adjustments by applying a transformation which transforms weight values to voltage adjustments.

In step S510, the voltage adjustments for each region are provided to the electronic mask generator 76 for determination of a revised spatial mask 75.

In steps S511 and S502, the system controller 50 sends a command to tune the image sensor 14 in accordance with the revised spatial mask 75. As described above, in step S504, the scene property analysis module 77 determines whether the captured spectral image is the final image, and if the scene property analysis module 77 determines that the captured image is the final image ("YES" in step S504), then the captured spectral image is stored (step S512).

Thus, the present disclosure contemplates apparatus and methods for image capture using an image capture apparatus that includes an imaging assembly. As seen herein, there are in combination an imaging assembly having a tunable spectral response, a location module constructed to receive geographic location of the image capture apparatus from a location sensor that obtains geographic location of the image capture apparatus and also a capture mask module constructed to construct a capture mask by calculations which use the geographic location, and an imaging assembly module constructed to apply the constructed capture mask to the imaging assembly, the imaging assembly being tunable in accordance with the capture mask. One such imaging assembly includes an imaging sensor that may be a transverse field detector (TFD) sensor, and the imaging sensor may capture multiple images.

Other examples may be developed in accordance with the description herein for use of an imaging assembly which has a spectral response which is tunable in accordance with a capture parameter, such as an imaging assembly with an image sensor which has a tunable spectral response or, as will be described with respect to FIGS. 18 and 19, an imaging assembly with an image sensor and a preceding color filter array which has a tunable spectral response.

In the embodiments described herein, the tunable imaging assembly may be tunable such that each pixel or each region of multiple pixels is tunable individually, such that the spectral responsivity of each pixel or region of pixels is tunable independently of the spectral responsivity of other pixels or regions of pixels. In some example embodiments, the entirety of the imaging assembly may be tuned to the same spectral responsivity, such that substantially all pixels and substantially all regions of pixels are tuned to substantially the same spectral responsivity.

Figure 18:
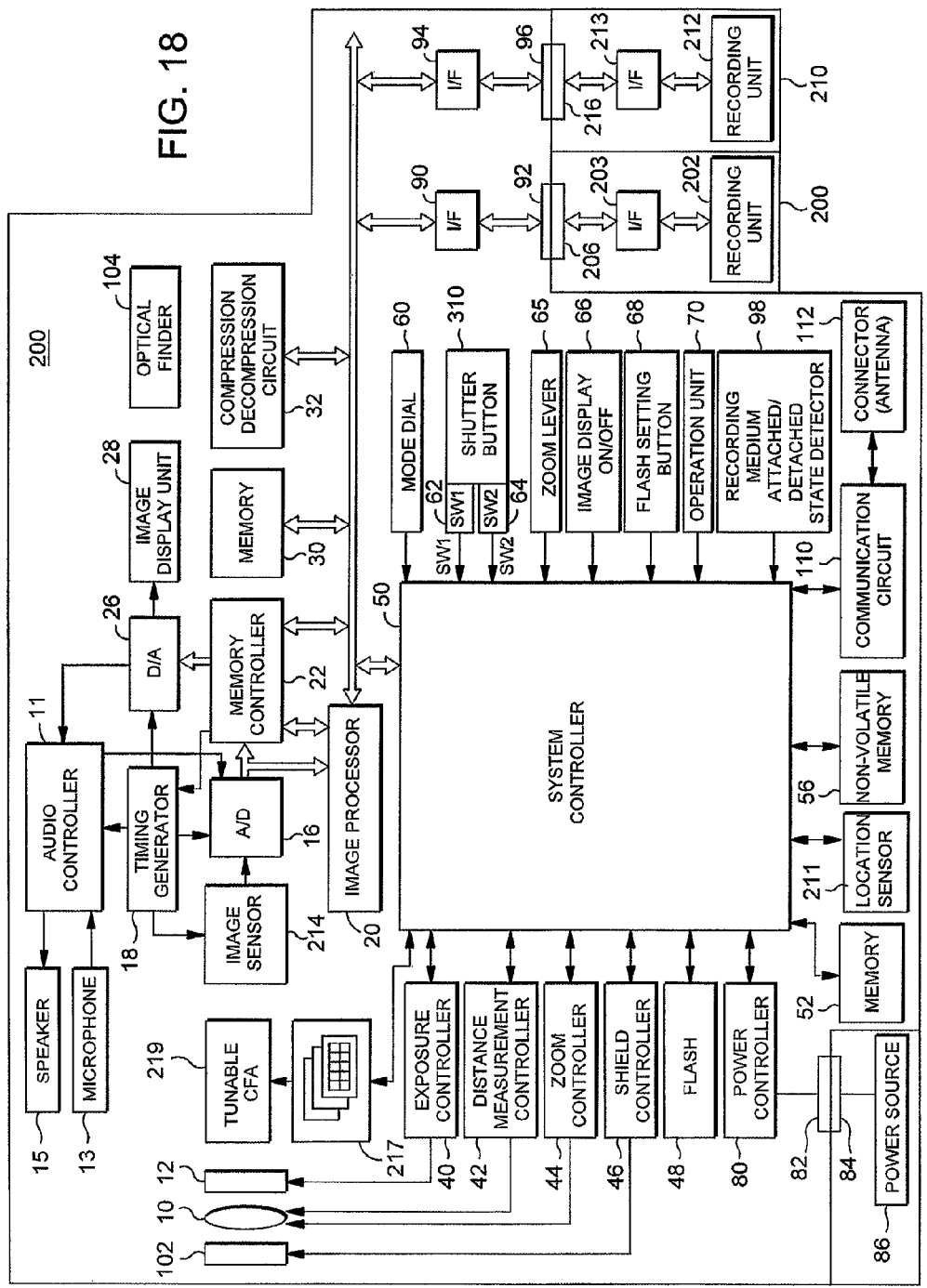
FIG. 18 is a block diagram showing an example embodiment of a multi-spectral digital camera.
Figure 19:
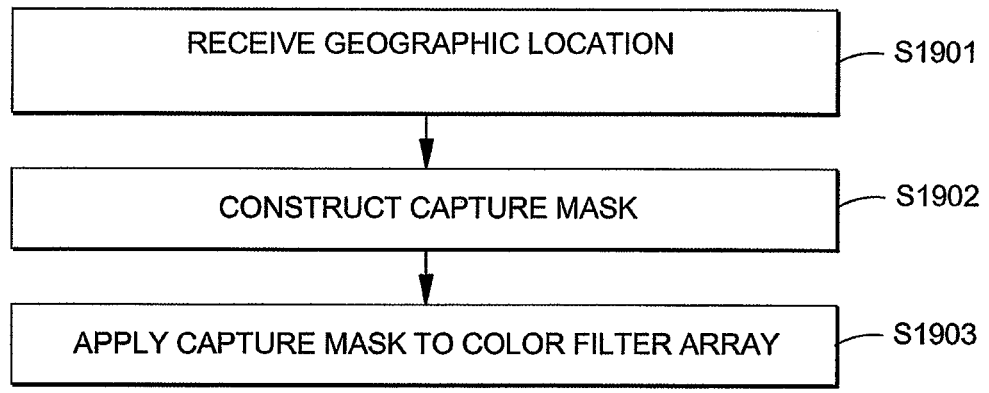
FIG. 19 is a flow diagram for explaining an example embodiment of a spectral image capture of a scene.

<FIGS. 18 and 19>

FIG. 18 is a block diagram showing another example embodiment of an arrangement of a digital camera 200. In the embodiment of FIG. 18, parts and features that are largely similar to those of the example embodiment of FIG. 2 are illustrated with like reference numerals, and a detailed explanation thereof is omitted in the interest of brevity.

One way that the embodiment of FIG. 18 differs from the embodiment of FIG. 2 concerns the construction of the tunable imaging assembly. In the embodiment of FIG. 2, the tunable imaging assembly includes tunable image sensor 14, perhaps in combination with optics such as lens 10. Because the image sensor 14 in the embodiment of FIG. 2 itself has a tunable spectral response, it is customary to omit a preceding color filter array, since the inclusion of any filter necessarily would decrease the signal-to-noise ratio by filtering the amount of light incident on image sensor 14.

In contrast, in the embodiment of FIG. 18, the spectral responsivity of image sensor 214 is not necessarily tunable, but rather the spectral responsivity of a preceding color filter array 219 is tunable in accordance with a capture parameter 217. Thus, in the example embodiment of FIG. 18, the tunable imaging assembly includes tunable color filter array (CFA) 219 and image sensor 214, perhaps in combination with optics such as lens 10. In the embodiment of FIG. 18, image sensor 214 is not necessarily tunable, although in other embodiments it might be.

FIG. 19 is a flow diagram for explaining operation of this example embodiment. The process steps shown in FIG. 19 are computer-executable process steps executed primarily by system controller 50 based on computer-executable process steps stored in a computer-readable memory medium such as non-volatile memory 56. In the embodiment of FIG. 19, steps and features that are largely similar to those of the example embodiment of FIG. 5 are omitted in the interest of brevity.

Briefly, according to FIG. 19, geographic location of the image capture apparatus is received from a location sensor that obtains geographic location of the image capture apparatus, and a capture mask is constructed by calculations which use the geographic location. The constructed capture mask is applied to the imaging assembly, the imaging assembly having a tunable spectral response and being tunable in accordance with the capture mask.

In more detail, in step S1901, geographic location of the image capture apparatus is received from location sensor 211, and in step S1902, a capture mask is constructed by calculations which use the geographic location. The capture mask is represented by a capture parameter 217 that is applied to tunable color filter array 219. The capture parameter may be a pre-designated capture parameter stored in non-volatile memory 56. In this example embodiment, the capture parameter may be a spatial mask which individually tunes each pixel or each region of plural pixels in tunable color filter array 219, such as by application of a spatial mask DR for a red-like channel of information, a spatial mask DGY for a green-yellow-like channel of information, a spatial mask DG for a green-like channel of information, a spatial mask DBG for a blue-green-like channel of information, and a spatial mask DB for a blue-like channel of information.

In step S1903, the constructed capture mask is applied to tunable color filter array 219, such that a final spectral image of the scene is captured.

In the embodiments described herein, the tunable color filter array may be tunable such that each pixel or each region of multiple pixels is tunable individually, such that the spectral responsivity of each pixel or region of pixels is tunable independently of the spectral responsivity of other pixels or regions of pixels. In some example embodiments, the entirety of the color filter array may be tuned to the same spectral responsivity, such that substantially all pixels and substantially all regions of pixels are tuned to substantially the same spectral responsivity.

<FIGS. 20 to 23>

Figure 20:
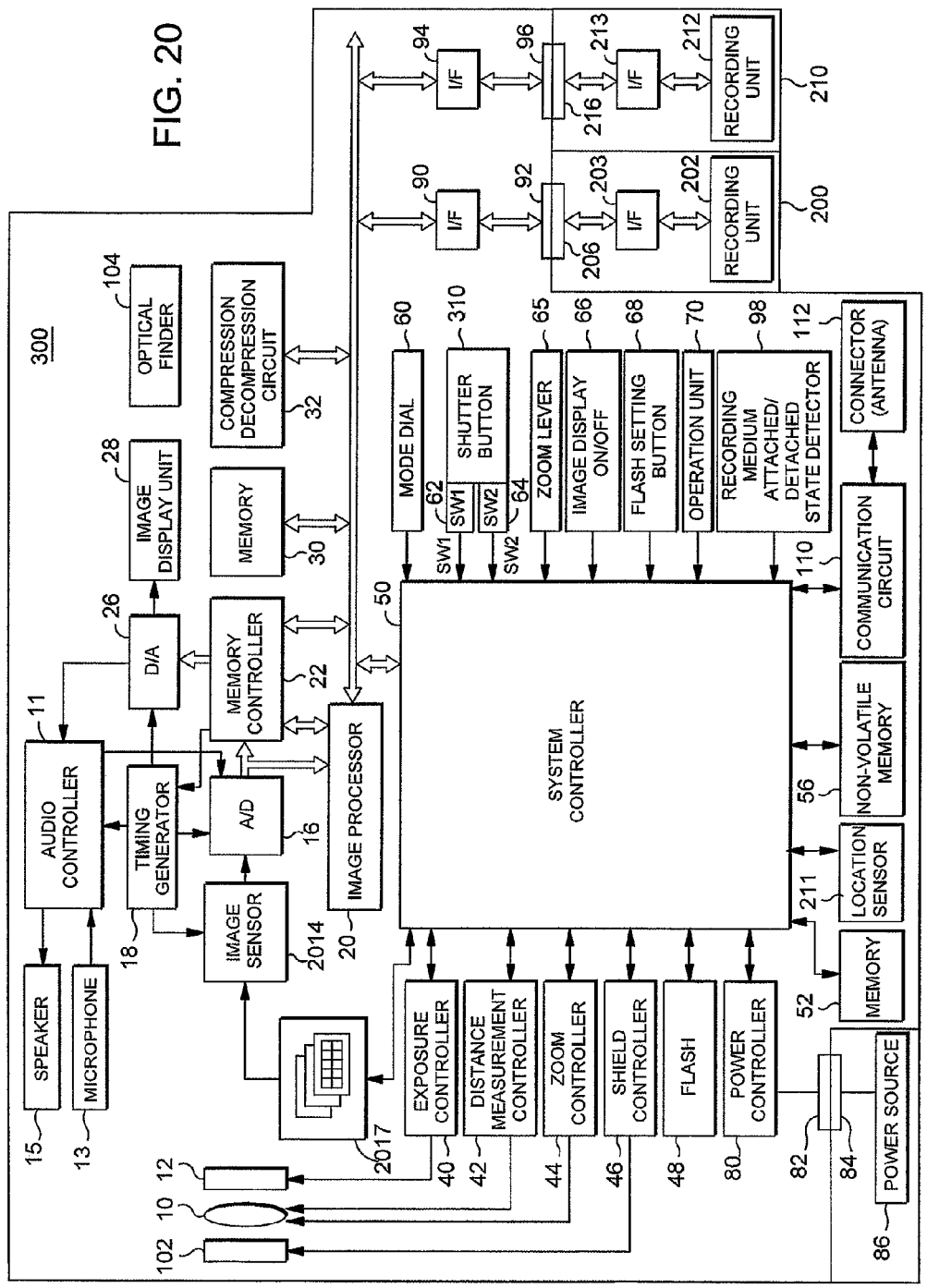
FIG. 20 is a block diagram showing an example embodiment of a digital camera.

FIG. 20 is a block diagram showing another example embodiment of an arrangement of a digital camera 300. In the embodiment of FIG. 20, parts and features that are largely similar to those of the example embodiment of FIG. 2 are illustrated with like reference numerals, and a detailed explanation thereof is omitted in the interest of brevity.

One way that the embodiment of FIG. 20 differs from the embodiment of FIG. 2 concerns the construction of the image sensor. In the embodiment of FIG. 2, the image sensor has a spectral response which is tunable in accordance with a capture mask that is constructed to obtain more than three (3) spectral components. In particular, the image sensor outputs five or more channels per pixel.

In contrast, in the embodiment of FIG. 20, the image sensor has a spectral response which is tunable in accordance with a capture mask that is constructed to obtain a relatively lower spatial resolution and more than three (3) spectral components. In particular, the image sensor outputs three channels per pixel, and the image sensor's sensitivities can be adjusted to provide two types of pixels. This arrangement is described in detail in U.S. application Ser. No. 12/949,566, by Francisco Imai, entitled "Adaptive Spatial Sampling Using An Imaging Assembly Having A Tunable Spectral Response", the contents of which are incorporated by reference herein.

In the embodiment of FIG. 20, a first type of pixel is a pixel type having a red-like channel, a green-like channel, and a blue-like channel, and the second type of pixel is a pixel having a magenta-like channel, a yellow-like channel, and a cyan-like channel. Thus, the image sensor is constructed to obtain images having six spectral components. The two types of pixels are alternately disposed spatially in a checkered pattern.

The image sensor 2014 of FIG. 20 involves a three channel transverse field detector (TFD) which has a tunable spectral responsivity that can be adjusted by application of bias voltages to control electrodes. In such a three channel TFD, symmetric biasing is applied to the TFD shown in FIG. 1, such that control electrodes #2A and #2B each receive the same bias voltage, and control electrodes #1A and #1B each receive the same bias voltage.

Referring to FIG. 20, capture parameter 2017 may be comprised of multiple spatial masks, with one mask each for each channel of information output by image sensor 2014. Thus, in this example, where image sensor 2014 outputs three channels for each pixel and image sensor 2014 is adjusted to provide two types of pixels, for the first type of pixel, capture parameter 2017 includes a spatial mask DR for the red-like channel of information, a spatial mask DG for the green-like channel of information, and a spatial mask DB for the blue-like channel of information. Similarly, for the second type of pixel, capture parameter 2017 includes a spatial mask DM for the magenta-like channel, a spatial mask DY for the yellow-like channel, and a spatial mask DC for the cyan-like channel.

Each spatial mask comprises an array of control parameters corresponding to pixels or regions of pixels in image sensor 2014. The spectral responsivity of each pixel, or each region of plural pixels, is thus tunable individually and independently of other pixels or regions of pixels. Image sensor 2014 may be comprised of a transverse field detector (TFD) sensor mentioned hereinabove. Spatial masks DR, DG, DB, DM, DY and DC may correspond to voltage biases applied to control electrodes of the TFD sensor.

Figure 21:
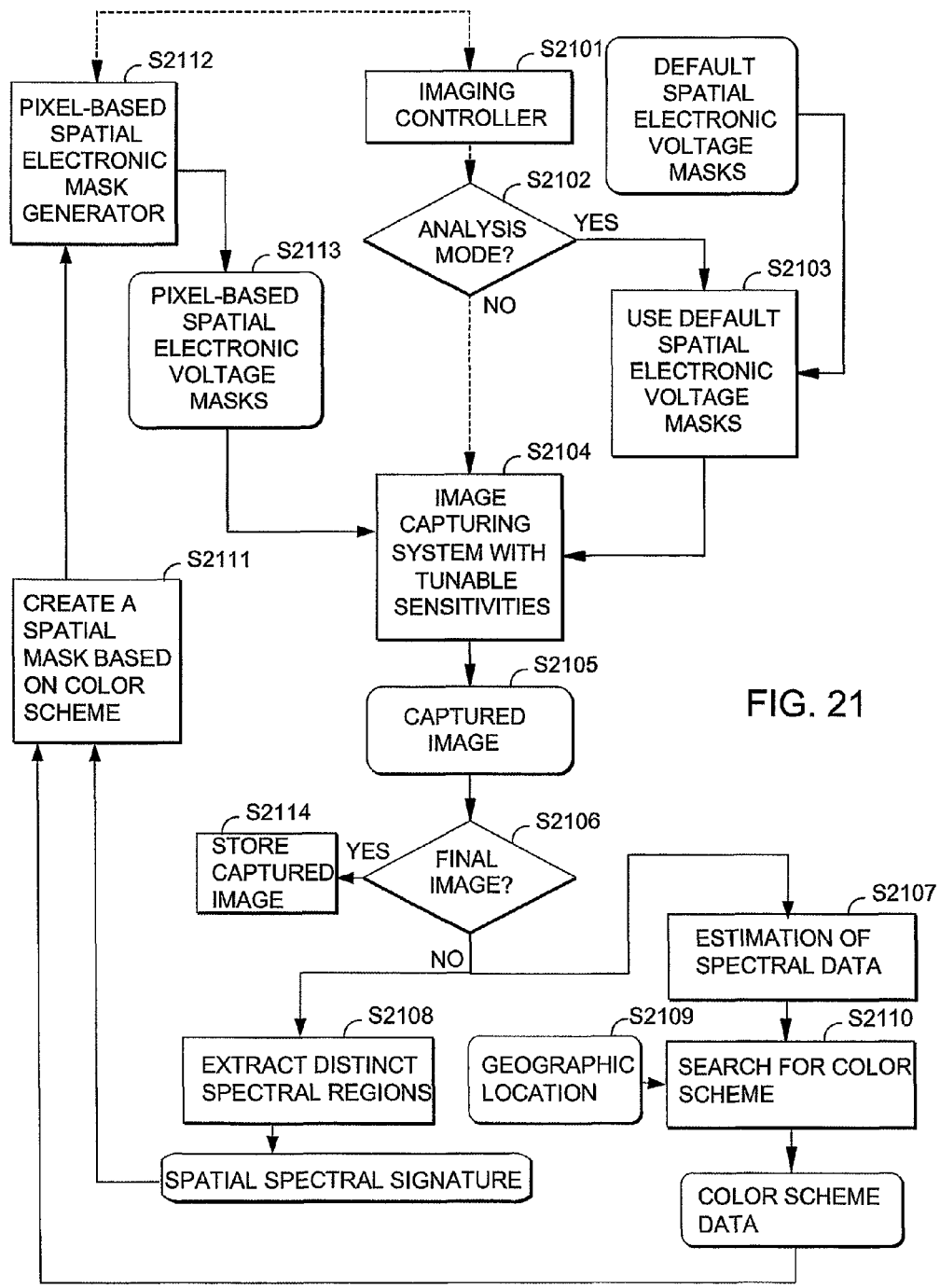
FIG. 21 is a flow diagram for explaining an example embodiment of image capture of a scene.

FIG. 21 is a flow diagram for explaining an example embodiment of an image capture of a scene by using the imaging sensor of FIG. 20. Image capture is performed by adjusting spectral selectivity of the imaging sensor of FIG. 20 by using a capture mask that is constructed by calculations which use geographic location.

In general, geographic location of an image capture apparatus is received from a location sensor that obtains geographic location of the image capture apparatus, and a capture mask is constructed by calculations which use the geographic location. The constructed capture mask is applied to the image sensor of FIG. 20. An image of a scene is captured and stored by using the image sensor which is tuned in accordance with the capture mask.

In example embodiments, the capture mask is constructed by calculations which use spectral signatures obtained from preview image data of the scene, in addition to the geographic location of the image capture apparatus. The preview image data is obtained by using a default capture mask to capture an image of the scene by using the image sensor of FIG. 20. The default capture mask is constructed to provide preview image data that has a high number of spectral components. More specifically, the geographic location is used to retrieve a color scheme for the scene that is stored in a database. The database stores information which correlates geographic location to color schemes used to determine capture parameters, and a database search is performed to retrieve the color scheme that corresponds to the received geographic location. The color schemes correlate spectral signatures to corresponding image capture adjustment values. The correlation between spectral signatures and image capture adjustment values can be determined based one or more of geographic location, cultural factors, object material identities, time and date information, and seasonal factors, and the like. The image capture adjustment values are used to construct that new capture mask.

In a particular embodiment shown in FIG. 21, geographic location of the digital camera 300 is received from the location sensor 211. A default capture mask (represented by capture parameter 2017 of FIG. 20) is constructed to obtain a relatively lower spatial resolution and more than three (3) spectral components. Preview image data having high number of spectral components is obtained by using the default capture mask to capture an image of a scene, and spectral signatures of the preview image data are obtained. A new capture mask is constructed (i.e., capture parameter 2017 of FIG. 20 is adjusted) by calculations which use both of the geographic location and the spectral signatures of the preview image data. The new capture mask is applied to the imaging sensor 2014, thereby tuning the image sensor in accordance with the capture mask. An image of the scene is captured and stored by using the image sensor which is tuned in accordance with the new capture mask. In this manner, the image sensor 2014 may provide captured images that are automatically adapted to the geographic location at which the image is captured.

Turning to the flow diagram of FIG. 21, in step S2101, system controller 50 controls a spatial electronic mask generator 76 to set-up an initial state for image sensor 2014, in a manner similar to that described above with respect to step S501 of FIG. 5.

Figure 22:
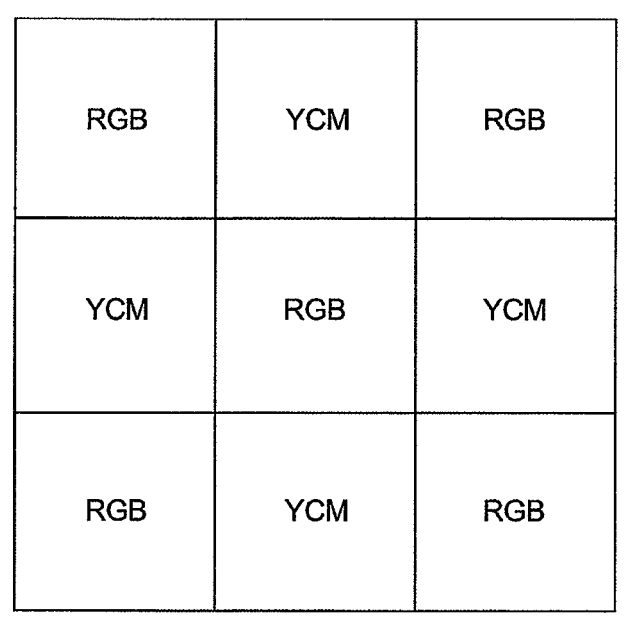

FIG. 22 shows one possible initial arrangement of pixels in image sensor 2014. FIG. 21 is a conceptual illustration of color channels of each pixel in image sensor 2014. As shown in FIG. 22, each pixel has three channels. In the example embodiment, in accordance with the default capture parameter 2017, sensitivities of image sensor 2014 are adjusted to have two types of pixels. In the example embodiment, a first type of pixel is a pixel type having a red-like channel, a green-like channel, and a blue-like channel, and the second type of pixel is a pixel having a magenta-like channel, a yellow-like channel, and a cyan-like channel. Thus, the default capture parameter 2017 has six spectral components. The two types of pixels are alternately disposed spatially in a checkered pattern. The depiction of the color channels of the image sensor 2014 are for ease of illustration, and is not indicative of actual number of spectral components, sensitivities and number of pixels of the image sensor 2014.

In step S2102, the system controller 50 determines whether a shooting mode is the analysis mode. In the example embodiment, the system controller 50 determines whether the shooting mode is the analysis mode based on a user input. For example, if the shutter of the digital camera is half-pressed, then it is determined that the shooting mode is the analysis mode, and if the shutter is full-pressed, then it is determined that the shooting mode is not the analysis mode. If the system controller 50 determines that the shooting mode is the analysis mode ("YES" at step S2102), then the scene property analysis module 77 supplies a pixel-based spatial electronic mask in accordance with the default capture parameter (step S2103), which is applied to the image sensor 2014. In particular, pixel-based spatial electronic mask 75 corresponds to the signals to produce the arrangement of pixels in the image sensor 2014, such that the image sensor 2014 has color channels for six different spectral sensitivities, and thus six spectral components.

In steps S2104 and S2105, the system controller 50 sends a command to the image sensor 2014 to capture an image using the pre-determined pixel-based spatial electronic mask 75.

At step S2106, the scene property analysis module 77 determines whether the captured image is the final image. In the example embodiment, the scene property analysis module 77 determines whether the captured image is the final image by identifying determining whether the image was captured in the analysis mode. If the image was captured in the analysis mode, then it is not the final image.

If the scene property analysis module 77 determines that the captured image is the final image ("YES" at step S2106), then processing proceeds to step S2114, in which the captured image is stored.

If the scene property analysis module 77 determines that the captured image is not the final image ("NO" at step S2106), then processing proceeds to step S2107. In step S2107, the scene property analysis module 77 performs demosaicing to create two images from the captured sample image. In particular, in the example embodiment, the image sensor 2014 is tuned to have the conceptual arrangement as shown in FIG. 22, therefore the captured image has both pixels having a red-like channel, a green-like channel, and a blue-like channel, and pixels having a magenta-like channel, a yellow-like channel, and a cyan-like channel. Thus, the captured sample image has six spectral components. In this embodiment, the captured sample image is demosaiced into two images: a Red-Green-Blue first image and a Yellow- Cyan-Magenta second image. Thus, the demosaiced first image and the demosaiced second image each have three spectral components.

In the example embodiment, the demosaiced first image is generated by removing the pixel data of the Yellow-Cyan-Magenta pixels from the captured sample image, thereby resulting in a Red-Green-Blue image. Similarly, the demosaiced second image is generated by removing the pixel data of the Red-Green-Blue pixels from the captured sample image, thereby resulting in a Yellow-Cyan-Magenta image. Thus, the resulting first and second images each have a lower spatial resolution as compared to the captured sample image that includes data for both the Red-Green-Blue pixels and the Yellow-Cyan-Magenta pixels.

In the example embodiment, spatial resolution of the first and second images is improved by performing interpolation. In particular, the Red-Green-Blue first image includes blank data for pixels corresponding to Yellow-Cyan-Magenta pixels of the captured sample image, and an interpolation is performed to provide interpolated Red-Green-Blue data for each blank pixel in the Red-Green-Blue first image. Similarly, the Yellow-Cyan-Magenta first image includes blank data for pixels corresponding to Red-Green-Blue pixels of the captured sample image, and an interpolation is performed to provide interpolated Yellow-Cyan-Magenta data for each blank pixel in the Yellow-Cyan-Magenta first image.

In the example embodiment, interpolated pixel data is obtained by using a weighted average of surrounding pixels. For purposes of illustration of such an interpolation process, FIG. 23A illustrates an example 3×3 pixel group of the captured sample image. As shown in FIG. 23A, Yellow-Cyan-Magenta pixels are in pixel positions 1, 3, 5, 7 and 9, and Red-Green-Blue pixels are in pixel positions 2, 4, 6 and 8.

The interpolation of a Red-Green-Blue pixel in pixel position 5 will now be described, in accordance with an example embodiment. As shown in FIG. 23A, a Yellow-Cyan-Magenta pixel is located at position 5 of the sample image. Therefore, demosaicing is performed to produce the Red-Green-Blue first image by replacing the Yellow-Cyan-Magenta data of pixel 5 with interpolated Red-Green-Blue data.

The interpolation of a red color channel in pixel position 5 (Red5) is shown as follows, wherein pixel 5 is surrounded by pixels 1, 2, 3, 4, 6, 7, 8, and 9: Red5=(2*(Red2+Red4+Red6+Red8)+(Yellow1+Yellow3+Yellow7+Yellow9+Magenta1+Magenta3+Magenta7+Magenta9))/16. Thus, in the example embodiment, red channels of surrounding pixels are weighted more (e.g., by a factor of 2) and red components from surrounding yellow and magenta channels are considered, but with a weight of 1 since in these channels only part of the information of the signals comes from red reflected or radiated light.

Similarly, the interpolation of a green color channel in pixel position 5 (Green5) is shown as follows: Green5=(2*(Green2+Green4+Green6+Green8)+(Yellow1+Yellow3+Yellow7+Yellow9+Cyan1+Cyan3+Cyan7+Cyan9))/16.

Likewise, the interpolation of a blue color channel in pixel position 5 (Blue5) is shown as follows: Blue5=(2*(Blue2+Blue4+Blue6+Blue8)+(Cyan1+Cyan3+Cyan7+Cyan9+Magenta1+Magenta3+Magenta7+Magenta9))/16.

FIG. 23B illustrates a demosaiced first image (corresponding to the image illustrated in FIG. 23A) after interpolation has been performed for pixels 1, 3, 7 and 9.

The interpolation of a Yellow-Cyan-Magenta pixel in pixel position 6 will now be described, in accordance with the example embodiment. As shown in FIG. 23A, a Red-Green-Blue pixel is located at position 6 of the sample image. Therefore, demosaicing is performed to produce the Yellow-Cyan-Magenta second image by replacing the Red-Green-Blue data of pixel 6 with interpolated Yellow-Cyan-Magenta data.

The interpolation of a Magenta color channel in pixel position 6 (Magenta6) is shown as follows, wherein pixel 6 is surrounded by pixels 2, 3, 5, 8, 9: Magenta6=(2*(Magenta3+Magenta5+Magenta9)+(Red2+Red8+Blue2+Blue8))/10. Thus, in the example embodiment, magenta channels of surrounding pixels are weighted more (e.g., by a factor of 2) and magenta components from surrounding red and blue channels are considered, but with a weight of 1 since in these channels only part of the information of the signals comes from magenta reflected or radiated light.

Similarly, the interpolation of a Yellow color channel in pixel position 6 (Yellow6) is shown as follows: Yellow6=(2*(Yellow3+Yellow5+Yellow9)+(Red2+Red8+Green2+Green8))/10.

Likewise, the interpolation of a Cyan color channel in pixel position 6 (Cyan6) is shown as follows: Cyan6=(2*(Cyan3+Cyan5+Cyan9)+(Green2+Green8+Blue2+Blue8))/10.

FIG. 23C illustrates a demosaiced second image (corresponding to the image illustrated in FIG. 23A) after interpolation has been performed for pixels 2, 4, 6 and 8.

Returning to FIG. 21, in step S2107 the demosaiced Red-Green-Blue image and the demosaiced Yellow-Cyan-Magenta image are analyzed by the scene property analysis module 77 to determine the spectral signature for each pixel. The demosaiced Red-Green-Blue image and the demosaiced Yellow-Cyan-Magenta image each provide three spectral components, for a combined total of six spectral components. The image sensor 2014 is initially tuned such that the six spectral components correspond to sensitivities centered in wavelengths which divide the visible spectrum of light with substantially equal levels of sensitivity. Thus, each spectral component is tuned to a spectral band within the visible spectrum.

In particular, the digital signal for each spectral component in each pixel in each of the two demosaiced images is analyzed to determine the spectral signature for each pixel. As described above, the image sensor 2014 is tuned such that each pixel provides six spectral components with sensitivities tuned to spectral bands which divide the visible spectrum of light with substantially equal levels of sensitivity. Therefore, the digital signal for each channel corresponds to a respective spectral band within the visible spectrum.

The digital signal for each spectral component is represented as a digital count level. The range of digital count levels is determined by the image sensor 2014. For example, for an imaging sensor with 10-bit acquisition capabilities for each channel, the digital count level would range from 0 units to 1024 units, wherein a channel will have a signal reading of 1024 units when the channel is saturated.

The digital reading for each pixel can be represented in a 6×1 matrix including digital count levels for each of the spectral components. The digital count level for each spectral component is converted to a set of numbers that can be related to a pre-determined set of eigenvectors. Thus, the signals produced by each pixel are converted into a set of numbers for each spectral band represented by the pixel, as determined by the tuning parameters for the pixel. This set of six numbers, one for each tuned spectral band, is the spectral signature of the pixel.

In the example embodiment, the spectral signature for each pixel is determined by using a look up table (LUT) of predetermined spectral signatures that maps digital count levels for each channel to a corresponding spectral signature. In mapping the digital count levels to spectral signatures, a threshold tolerance is applied to accommodate variability of spectral curves in one spectral signature category as well as effects of imaging system noise.

In other embodiments, the spectral signature for each pixel can be estimated by applying a predetermined transformation to the digital count levels for each channel of the pixel.

In steps S2108, S2109, S2110, S2111, S2112 and S2113, geographic location of the digital camera of FIG. 20 is received from the location sensor 211, a capture mask is constructed by calculations which use the geographic location, and the constructed capture mask is applied to the image sensor 2014, as described above with respect to steps S506, S507, S508, S509, S510 and S511 of FIG. 5.

In another example embodiment, rather than adjust the image sensor to have two types of pixels alternately disposed spatially in a checkered pattern, so as to obtain an image having six spectral components, the image sensor is adjusted to so as to obtain images having three spectral components. The image sensor is adjusted so as to obtain images having, for example, a red-like channel, a green-like channel, and a blue-like channel, and a first image is captured. Thereafter, the image sensor is adjusted so as to obtain images having a second set of channels, such as, for example, a magenta-like channel, a yellow-like channel, and a cyan-like channel, and a second image is captured. In this manner, two images of the scene are captured with two sets of different capture parameters, so as to obtain six spectral components. Thus, for each image, the capture mask is constructed to obtain a relatively higher spatial resolution and a relatively lower number of spectral components, as compared to the embodiment described with respect to FIGS. 20 to 23. This arrangement is described in detail in U.S. application Ser. No. 12/859,115, by Francisco Imai, entitled "Image Capture With Identification Of Illuminant", the contents of which are incorporated by reference herein.

Having captured the two images, spectral signatures are obtained, geographic location of the digital camera is received from the location sensor, a capture mask is constructed by calculations which use the geographic location, and the constructed capture mask is applied to the image sensor, as described above for FIG. 20.

In other embodiments in which spectral signatures are obtained from either two captured preview images or from two preview images obtained by demosaicing a single captured image, the spectral responsivity of the image sensor is not necessarily tunable, but rather the spectral responsivity of a preceding color filter array is tunable. Thus, in such an embodiment, the image capture apparatus differs from the image processing apparatus of FIG. 20 in that it has a tunable imaging assembly that includes a tunable color filter array (CFA) and an image sensor, as described above with respect to FIG. 18.

In this embodiment in which a color filter array is used in connection with an image capture apparatus that obtains spectral signatures from two preview images, computer-executable process steps executed primarily by a system controller based on computer-executable process steps stored in a computer-readable memory medium, such as a non-volatile memory, receive geographic location of the image capture apparatus from a location sensor that obtains geographic location of the image capture apparatus, construct a capture mask by calculations which use the geographic location, and apply the constructed capture mask to the imaging assembly, the imaging assembly having a tunable spectral response and being tunable in accordance with the capture mask.

In more detail, the capture mask is represented by a capture parameter that is applied to the tunable color filter array. The capture parameter may be a pre-designated capture parameter stored in a non-volatile memory. In this example embodiment, the capture parameter may be a spatial mask which individually tunes each pixel or each region of plural pixels in the tunable color filter array. The constructed capture mask is applied to the tunable color filter array, such that a final spectral image of the scene is captured.

In the embodiments described herein, the tunable color filter array may be tunable such that each pixel or each region of multiple pixels is tunable individually, such that the spectral responsivity of each pixel or region of pixels is tunable independently of the spectral responsivity of other pixels or regions of pixels. In some example embodiments, the entirety of the color filter array may be tuned to the same spectral responsivity, such that substantially all pixels and substantially all regions of pixels are tuned to substantially the same spectral responsivity.

Other Embodiments

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for image capture using an image capture apparatus that includes an imaging assembly, the method comprising:
   receiving geographic location of the image capture apparatus from a location sensor that obtains geographic location of the image capture apparatus;
   constructing a capture mask by calculations which use the geographic location; and
   applying the constructed capture mask to the imaging assembly, the imaging assembly having a tunable spectral response and being tunable in accordance with the capture mask;
   wherein the capture mask is constructed to obtain three channels of spectral components,
   wherein preview image data having more than three channels of spectral components is obtained,
   wherein spectral signatures of objects in the preview are obtained,
   wherein materials of the objects are identified based on the spectral signatures, and
   wherein the capture mask is constructed by calculations which use both of the geographic location and the identities of the materials of the objects in the preview.

2. A method for image capture using an image capture apparatus that includes an imaging assembly, the method comprising:
   receiving geographic location of the image capture apparatus from a location sensor that obtains geographic location of the image capture apparatus;
   constructing a capture mask by calculations which use the geographic location; and
   applying the constructed capture mask to the imaging assembly, the imaging assembly having a tunable spectral response and being tunable in accordance with the capture mask;
   wherein the capture mask is constructed to obtain more than three (3) spectral components,
   wherein preview image data having more than three spectral components is obtained,
   wherein spectral signatures of objects in the preview are obtained,
   wherein materials of the objects are identified based on the spectral signatures, and
   wherein the capture mask is constructed by calculations which use both of the geographic location and the identities of the materials of the objects in the preview.

3. The method according to claim 2, wherein the identities of the materials of the objects in the preview are used to identify a photographic subject of the image.

4. A module for image capture using an image capture apparatus that includes an imaging assembly, the module comprising:
   a location module constructed to receive geographic location of the image capture apparatus from a location sensor that obtains geographic location of the image capture apparatus;
   a capture mask module constructed to construct a capture mask by calculations which use the geographic location; and
   an imaging assembly module constructed to apply the constructed capture mask to the imaging assembly, the imaging assembly having a tunable spectral response and being tunable in accordance with the capture mask;
   wherein the capture mask is constructed to obtain three channels of spectral components,
   wherein preview image data having more than three channels of spectral components is obtained,
   wherein spectral signatures of objects in the preview are obtained,
   wherein materials of the objects are identified based on the spectral signatures, and
   wherein the capture mask is constructed by calculations which use both of the geographic location and the identities of the materials of the objects in the preview.

5. A module for image capture using an image capture apparatus that includes an imaging assembly, the module comprising:
   a location module constructed to receive geographic location of the image capture apparatus from a location sensor that obtains geographic location of the image capture apparatus;
   a capture mask module constructed to construct a capture mask by calculations which use the geographic location; and
   an imaging assembly module constructed to apply the constructed capture mask to the imaging assembly, the imaging assembly having a tunable spectral response and being tunable in accordance with the capture mask;
   wherein the capture mask is constructed to obtain more than three (3) spectral components,
   wherein preview image data having more than three spectral components is obtained,
   wherein spectral signatures of objects in the preview are obtained,
   wherein materials of the objects are identified based on the spectral signatures, and
   wherein the capture mask is constructed by calculations which use both of the geographic location and the identities of the materials of the objects in the preview.

6. The module according to claim 5, wherein the identities of the materials of the objects in the preview are used to identify a photographic subject of the image.

7. An image capture apparatus comprising:
an imaging assembly which has a tunable spectral response, and which is tunable in accordance with a capture mask;
a location sensor configured to obtain geographic location of the image capture apparatus; and
a controller constructed to receive geographic location of the image capture apparatus from the location sensor, to construct a capture mask by calculations which use the geographic location, and to apply the constructed capture mask to the image sensor;
wherein the capture mask is constructed to obtain three channels of spectral components,
wherein the image capture apparatus further comprises a preview module which obtains preview image data having more than three channels of spectral components, and
wherein the controller is further constructed to:
obtain spectral signatures of objects in the preview;
identify materials of the objects based on the spectral signatures; and
construct the capture mask by calculations which use both of the geographic location and the identities of the materials of the objects in the preview.

8. An image capture apparatus comprising:
an imaging assembly which has a tunable spectral response, and which is tunable in accordance with a capture mask;
a location sensor configured to obtain geographic location of the image capture apparatus; and
a controller constructed to receive geographic location of the image capture apparatus from the location sensor, to construct a capture mask by calculations which use the geographic location, and to apply the constructed capture mask to the image sensor;
wherein the capture mask is constructed to obtain more than three (3) spectral components,
wherein the image capture apparatus further comprises a preview module which obtains preview image data having more than three spectral components, and
wherein the controller is further constructed to:
obtain spectral signatures of objects in the preview;
identify materials of the objects based on the spectral signatures; and
construct the capture mask by calculations which use both of the geographic location and the identities of the materials of the objects in the preview.

9. The image capture apparatus according to claim 8, wherein the identities of the materials of the objects in the preview are used to identify a photographic subject of the image.

10. A non-transitory computer-readable storage medium on which is retrievably stored computer-executable process steps for image capture using an image capture apparatus that includes an imaging assembly, the process steps comprising:
receiving geographic location of the image capture apparatus from a location sensor that obtains geographic location of the image capture apparatus;
constructing a capture mask by calculations which use the geographic location; and
applying the constructed capture mask to the imaging assembly, the imaging assembly having a tunable spectral response and being tunable in accordance with the capture mask;
wherein the capture mask is constructed to obtain three channels of spectral components,
wherein preview image data having more than three channels of spectral components is obtained,
wherein spectral signatures of objects in the preview are obtained,
wherein materials of the objects are identified based on the spectral signatures, and
wherein the capture mask is constructed by calculations which use both of the geographic location and the identities of the materials of the objects in the preview.

11. A non-transitory computer-readable storage medium on which is retrievably stored computer-executable process steps for image capture using an image capture apparatus that includes an imaging assembly, the process steps comprising:
receiving geographic location of the image capture apparatus from a location sensor that obtains geographic location of the image capture apparatus;
constructing a capture mask by calculations which use the geographic location; and
applying the constructed capture mask to the imaging assembly, the imaging assembly having a tunable spectral response and being tunable in accordance with the capture mask;
wherein the capture mask is constructed to obtain more than three (3) spectral components,
wherein preview image data having more than three spectral components is obtained,
wherein spectral signatures of objects in the preview are obtained,
wherein materials of the objects are identified based on the spectral signatures, and
wherein the capture mask is constructed by calculations which use both of the geographic location and the identities of the materials of the objects in the preview.

12. The computer-readable storage medium according to claim 11, wherein the identities of the materials of the objects in the preview are used to identify a photographic subject of the image.

* * * * *